(12) United States Patent
Smith et al.

(10) Patent No.: US 6,932,753 B1
(45) Date of Patent: Aug. 23, 2005

(54) FOOD SERVING PAPERBOARD CONTAINER PRESSING APPARATUS EMPLOYING CAST-IN ELECTRICAL HEATERS

(75) Inventors: Bruce R. Smith, Fairfield, CT (US); Albert D. Johns, Saylorsburg, PA (US); Mircea Sofronie, Easton, PA (US); Mark B. Littlejohn, Appleton, WI (US); Thomas W. Zelinski, Menasha, WI (US)

(73) Assignee: Fort James Corporation, Deerfield, IL (US)

( * ) Notice: Subject to any disclaimer, the term of this patent is extended or adjusted under 35 U.S.C. 154(b) by 0 days.

(21) Appl. No.: 09/453,498

(22) Filed: Dec. 3, 1999

Related U.S. Application Data
(60) Provisional application No. 60/111,568, filed on Dec. 9, 1998.

(51) Int. Cl.[7] ............................................. B31B 1/44
(52) U.S. Cl. ........................................ 493/167; 493/185
(58) Field of Search .............................. 493/152, 167, 493/902, 185, 464; 219/535, 406, 408, 411

(56) References Cited

U.S. PATENT DOCUMENTS

| | | | |
|---|---|---|---|
| 1,553,504 A | 9/1925 | Buchanan ................. 493/81 |
| 2,060,968 A | 11/1936 | Beck et al. .............. 219/458.1 |
| 2,592,340 A | 4/1952 | Ronceray .................. 764/212 |
| 2,890,318 A | 6/1959 | Kruse ..................... 219/540 |
| 3,378,991 A | 4/1968 | Anderson ................. 53/329.3 |
| 4,609,140 A | 9/1986 | Van Handel et al. ....... 229/406 |
| 4,721,499 A | 1/1988 | Marx et al. ............... 493/152 |
| 4,721,500 A | 1/1988 | Handel et al. ............. 493/152 |
| 4,832,676 A | * 5/1989 | Johns et al. |
| 5,489,200 A | 2/1996 | McGraw et al. ............ 425/144 |
| 5,555,798 A | 9/1996 | Miyashita et al. .......... 100/318 |
| 5,575,941 A | 11/1996 | Johnson .................... 219/544 |
| 6,018,616 A | * 1/2000 | Schaper |
| 6,029,730 A | * 2/2000 | Gospe et al. |
| 6,180,926 B1 | * 1/2001 | Duddy et al. |

* cited by examiner

*Primary Examiner*—Eugene Kim
(74) *Attorney, Agent, or Firm*—Michael W. Ferrell

(57) ABSTRACT

A pressing apparatus for producing a food service paperboard container from a paperboard blank so that the paperboard container possesses an overturned rim provided with folds includes a first die and a second die that are movable relative to one another. The first die includes a first base and a first platform that is movable with respect to the first base, with the first base having a curved surface for engaging the outer periphery of the paperboard blank. The second die is positioned in opposing relation to the first die and includes a second base and a second platform that is movable with respect to the second base. The second die is movable with respect to the first die and the second base has a curved surface for engaging the outer periphery of the paperboard blank so that the outer periphery of the paperboard blank is pressed between the curved surface of the first base and the curved surface of the second base. A first cast-in heater is mounted within a recess in the first die and includes a resistor wire embedded within a thermally conductive cast-in material. A second cast-in heater is mounted within a recess in the second die and includes a resistor wire embedded within a thermally conductive cast-in material.

26 Claims, 17 Drawing Sheets

Fig. 20

Case #1: 3 Ring Heater System

| Ring Heater Life (Months) | # Ring Heaters Per Die Set | # Cast Heater Per Die Set | # Die Sets per Press | Average # Ring Heater Falls/year | Break Even Cast Heater Falls/year | Break Even Cast Heater Life (Months) |
|---|---|---|---|---|---|---|
| 1 | 3 | 2 | 5 | 180.0 | 65.8 | 1.8 |
| 2 | 3 | 2 | 5 | 90.0 | 32.9 | 3.6 |
| 3 | 3 | 2 | 5 | 60.0 | 21.9 | 5.5 |
| 4 | 3 | 2 | 5 | 45.0 | 16.5 | 7.3 |
| 5 | 3 | 2 | 5 | 36.0 | 13.2 | 9.1 |
| 6 | 3 | 2 | 5 | 30.0 | 11.0 | 10.9 |
| 7 | 3 | 2 | 5 | 25.7 | 9.4 | 12.8 |
| 8 | 3 | 2 | 5 | 22.5 | 8.2 | 14.6 |
| 9 | 3 | 2 | 5 | 20.0 | 7.3 | 16.4 |
| 10 | 3 | 2 | 5 | 18.0 | 6.6 | 18.2 |
| 11 | 3 | 2 | 5 | 16.4 | 6.0 | 20.1 |
| 12 | 3 | 2 | 5 | 15.0 | 5.5 | 21.9 |
| 13 | 3 | 2 | 5 | 13.8 | 5.1 | 23.7 |
| 14 | 3 | 2 | 5 | 12.9 | 4.7 | 25.5 |
| 15 | 3 | 2 | 5 | 12.0 | 4.4 | 27.4 |
| 16 | 3 | 2 | 5 | 11.3 | 4.1 | 29.2 |
| 17 | 3 | 2 | 5 | 10.6 | 3.9 | 31.0 |
| 18 | 3 | 2 | 5 | 10.0 | 3.7 | 32.8 |
| 19 | 3 | 2 | 5 | 9.5 | 3.5 | 34.6 |
| 20 | 3 | 2 | 5 | 9.0 | 3.3 | 36.5 |
| 21 | 3 | 2 | 5 | 8.6 | 3.1 | 38.3 |
| 22 | 3 | 2 | 5 | 8.2 | 3.0 | 40.1 |
| 23 | 3 | 2 | 5 | 7.8 | 2.9 | 41.9 |
| 24 | 3 | 2 | 5 | 7.5 | 2.7 | 43.8 |

Case #2: 4 Ring Heater System

| Ring Heater Life (Months) | # Ring Heaters Per Die Set | # Cast Heater Per Die Set | # Die Sets per Press | Average # Ring Heater Fails/year | Break Even # Cast Heater Fails/year | Break Even Cast Heater Life (Months) |
|---|---|---|---|---|---|---|
| 1 | 4 | 2 | 5 | 240.0 | 107.7 | 1.1 |
| 2 | 4 | 2 | 5 | 120.0 | 53.9 | 2.2 |
| 3 | 4 | 2 | 5 | 80.0 | 35.9 | 3.3 |
| 4 | 4 | 2 | 5 | 60.0 | 26.9 | 4.5 |
| 5 | 4 | 2 | 5 | 48.0 | 21.5 | 5.6 |
| 6 | 4 | 2 | 5 | 40.0 | 18.0 | 6.7 |
| 7 | 4 | 2 | 5 | 34.3 | 15.4 | 7.8 |
| 8 | 4 | 2 | 5 | 30.0 | 13.5 | 8.9 |
| 9 | 4 | 2 | 5 | 26.7 | 12.0 | 10.0 |
| 10 | 4 | 2 | 5 | 24.0 | 10.8 | 11.1 |
| 11 | 4 | 2 | 5 | 21.8 | 9.8 | 12.3 |
| 12 | 4 | 2 | 5 | 20.0 | 9.0 | 13.4 |
| 13 | 4 | 2 | 5 | 18.5 | 8.3 | 14.5 |
| 14 | 4 | 2 | 5 | 17.1 | 7.7 | 15.6 |
| 15 | 4 | 2 | 5 | 16.0 | 7.2 | 16.7 |
| 16 | 4 | 2 | 5 | 15.0 | 6.7 | 17.8 |
| 17 | 4 | 2 | 5 | 14.1 | 6.3 | 18.9 |
| 18 | 4 | 2 | 5 | 13.3 | 6.0 | 20.1 |
| 19 | 4 | 2 | 5 | 12.6 | 5.7 | 21.2 |
| 20 | 4 | 2 | 5 | 12.0 | 5.4 | 22.3 |
| 21 | 4 | 2 | 5 | 11.4 | 5.1 | 23.4 |
| 22 | 4 | 2 | 5 | 10.9 | 4.9 | 24.5 |
| 23 | 4 | 2 | 5 | 10.4 | 4.7 | 25.6 |
| 24 | 4 | 2 | 5 | 10.0 | 4.5 | 26.7 |

Fig. 21

FOOD SERVING PAPERBOARD CONTAINER PRESSING APPARATUS EMPLOYING CAST-IN ELECTRICAL HEATERS

This application is based on and claims priority under 35 U.S.C. §119(e) with respect to U.S. Provisional Patent Application No. 60/111,568 filed on Dec. 9, 1998.

FIELD OF THE INVENTION

The present invention generally relates to a pressing apparatus for forming food service paperboard articles. More particularly, the present invention pertains to an apparatus for press forming food service paperboard container products such as plates, bowls, trays and platters.

BACKGROUND OF THE INVENTION

U.S. Pat. Nos. 4,721,500, 4,609,140, 4,721,499, 5,088,640, 5,326,020, 4,832,676 and 4,606,496 describe processes and apparatus for forming food service paperboard container products such as paper trays, plates and the like from a paperboard blank, and food service paperboard container products formed from such processes and apparatus. The patents describe that the paperboard blank is formed into the desired paperboard container product through use of a pressing apparatus that applies heat and pressure to the paperboard blank.

The apparatus typically used in the disclosed process includes an upper die and a lower die. In practice, both the lower die and the upper die are heated by a heating mechanism in the form of one or more electrically resistive ring heaters. Ring heaters are commonly used because they are relatively inexpensive Typically, the lower die is provided with a pair of nested ring heaters or a single ring heater, while the upper die is outfitted with either a pair of nested ring heaters or a single ring heater, depending upon the particular product being formed. Quite often, the heat requirements related to the way in which the paperboard container products are formed necessitate that at least two ring heaters be provided in both the upper die and the lower die.

FIG. 1 illustrates a pair of nested ring heaters similar to those used in the apparatus for press forming paperboard blanks into paperboard container products. As can be seen from FIG. 1, the pair of nested ring heaters includes an annular outer ring heater 60 and an annular inner ring heater 62, with the inner ring heater 62 being nested within the outer ring heater 60. The pair of nested ring heaters 60, 62 is fitted inside a cavity in the lower die. As mentioned above, the upper die can be provided with a similar pair of nested ring heaters, or it can be outfitted with only a single ring heater, depending upon the requirements of a particular system.

Ring heaters can be purchased as off-the-shelf items from a suitable supplier. However, to produce food service paperboard articles in the manner described in the aforementioned patents, significantly high temperatures are required and this necessitates that the ring heaters possess a very high wattage. Thus, for these applications, it is typically necessary to special order the ring heaters having the desired wattage, as well as the desired size, voltage and/or terminations.

As can be further seen from FIG. 1, the outer ring heater 60 includes a pair of terminals 70 and the inner ring heater 62 also includes a pair of terminals 72. Typically, the terminals 70 on the outer ring heater 60 are connected to the power source, and an electrical connection is then made between the pair of terminals 70 on the outer ring heater 60 and the pair of terminals 72 on the inner ring heater 62.

It has been found that a cold spot (lower temperatures) typically exists in the region of the terminals 70, 72 due to the terminal connections which means that a cold spot will also exist in the die in the region of the pressing surface corresponding to the locations of the terminals 70, 72. Thus, to avoid a cold spot in the die and provide generally uniform heating around the entire circumference of the heater mechanism defined by the pair of ring heaters 60, 62, it is desirable that the pair of terminals 70 on the outer ring heater 60 be offset 180° with respect to the pair of terminals 72 on the inner ring heater 62. In practice, this has been found to be somewhat problematic in that the wire that connects the pair of terminals 70 on the outer ring heater 60 to the pair of terminals 72 on the inner ring heater 62 can run excessively hot in the enclosed die cavities, resulting in wire insulation degradation and failure due to the wires shorting to ground. Thus, it is common in practice to position the inner and outer ring heaters 60, 62 in the manner illustrated in FIG. 1 so that the terminals 70, 72 can be connected together with an electrical buss bar or the like. This connection is not susceptible to the same type of failure mentioned above. However, this orientation of the two ring heaters 60, 62 creates a cold spot at the place where the terminals 70, 72 are located. This thus creates a temperature differential around the circumference of the die. By virtue of this arrangement of the nested ring heaters 60, 62, it has been found that a temperature differential of up to approximately 30° F.–40° F. can exist between the portion of the die forming surface corresponding to the location of the terminals 70, 72 and the diametrically opposite portion of the die forming surface that is offset 180°. From the standpoint of carrying out the method described in the aforementioned patents, this temperature differential can be quite significant and rather problematic.

It has also been found that the wires used to connect the outer ring heater 60 to the power source have a tendency to break. It is believed that this is due at least in part to the fact that the wire is connected directly to the ring heater 60 and passes thru part of the hot enclosed die cavity resulting in wire degradation. Further, the cycling/movement of the press apparatus can result in wire breakage due to repetitive flexing. The relatively high temperature at which the ring heaters are operated may also contribute to this problem.

A further problem associated with the use of ring heaters in the context of the pressing apparatus described in the aforementioned patents for press forming a paperboard blank into a food serving paperboard container product involves the significant discrepancy between the wattage ratings of the ring heaters and the wattage needed to perform the pressing operation. To carry out the press forming operation described in the aforementioned patents, a relatively high die surface temperature in the range of about 280° F.–400° F. is typically required. Further, the press forming apparatus must be capable of high speed production. The wattage needed to carry out the process described in the aforementioned patents (i.e., to achieve the necessary temperature on the die surfaces) at the high speed production required for commercial practice is much higher than the wattage for which the ring heaters 60, 62 are rated. The pressing apparatus is typically designed in a way that only permits the use of ring heaters of a certain size and so it is not a truly viable option to simply use larger ring heaters rated at a higher wattage. Given the limitations imposed by the current design of the pressing apparatus, the ring heaters that are capable of being used in the pressing apparatus have power wattage ratings on the order of 300–1200 watts. However, during operation of the pressing apparatus in the manner necessary for carrying out the process described in the aforementioned patents, the ring heaters are typically run at a much higher wattage, on the order of 1500 watts–5000 watts. Operating the ring heaters at levels such as these that greatly exceed the wattage ratings of the heaters significantly reduces the life of the ring heaters.

The ring heaters 60, 62 illustrated in FIG. 1 also suffer from certain disadvantages and drawbacks by virtue of the way in which they are constructed. FIG. 2A illustrates the outer ring heater 60 in cross-section. As seen in FIG. 2A, the ring heater 60 includes an outer sheath defined by a generally U-shaped portion 74 and a plate-like cover 76. The U-shaped portion 74 and the cover 76 are commonly made of steel, aluminized steel or incoloy alloy stainless steel. The U-shaped portion 74 includes a bottom wall 84 and a pair of upstanding sidewalls 82 whose upper ends are bent inwardly towards one another. The cover 76 is then secured to these inwardly bent ends of the upstanding sidewalls 82. Positioned within the sheath 74, 76 is a coiled wire 78 that is surrounded by a refractory material 80. The wire 78 is commonly made of nichrome steel to obtain the required electrical resistance. The refractory material 80 is commonly magnesium oxide powder which is compressed during ring heater production.

The difficulties associated with this ring heater construction is that the magnesium oxide refractory material 80 has an affinity for water. During use of the ring heater as the ring heater is heating up, the Incoloy sheath 74, 76 can expand and distorts so that small spaces are created in the area where the cover 76 is secured to the inwardly bent ends of the sidewalls 82. Water is thus able to infiltrate into the magnesium oxide refractory material 80 during ring heater cool down. As the ring heater becomes hot during subsequent heating, the water that has infiltrated into the magnesium oxide refractory material will become heated, thus creating steam pressure that distorts the configuration of the Incoloy sheath. Ideally, it is preferred that the bottom wall 84 be as flat as possible to provide the largest contact area with the facing bottom surface of the recess in the die. If water infiltrates the magnesium oxide refractory material and ultimately is transformed into steam pressure that distorts the sheath, it has been found that the bottom wall 84' of the Incoloy sheath tends to distort and take on a curved configuration as shown in FIG. 2B. This curved bottom wall 84' creates a non-flat heating surface which means a significant loss of contact area with the die, thus causing inadequate non-uniform heating. Also, this can significantly reduce the conductive heat transfer to the die. This is part of the reason why the ring heaters need to be operated at a wattage significantly higher than the wattage rating of the ring heaters.

A further difficulty associated with the aforementioned distortion of the ring heater is that it places further strain on the operational rating of the ring heater. Typically, the upper and lower dies in which the pair of nested ring heaters are positioned include respective thermocouple probes that measure the temperature near the surfaces of the upper and lower dies to determine the operating parameters of the respective ring heaters. When the thermocouple detects that the temperatures are too low, the ring heaters are turned on at full wattage for time proportioned periods regulated by a temperature controller. When the bottom wall 84' of the ring heater distorts in the manner illustrated in FIG. 2B, heat is not effectively transferred to the die and so the thermocouple senses that the die heating surfaces are not hot enough. This causes the ring heaters to be run at full wattage and higher temperatures for longer time periods, thus creating further operational problems and significantly reducing the operating life of the ring heaters.

The ring heaters typically used in the pressing apparatus for carrying out the process described in the aforementioned patents are typically rated at 240 volts. If it is necessary to use a higher voltage, the length of wire wound in the ring heater can be increased. However, because of the size limitations associated with the construction of the lower and upper dies, it is difficult to use a larger ring heater having an increased amount of wound wire. The other alternative for achieving the higher voltage is to use thinner wire or wire having a reduced diameter and higher electrical resistance. Unfortunately, it has been found that this makes the wire particularly susceptible to breakage or other damage due to the operating conditions associated with pressing apparatus, namely the repetitive pounding and impacting, and the high temperatures.

From the foregoing, it is apparent that the use of ring heaters as the heat source for heating the pressing surfaces of a pressing apparatus that is designed to press form paperboard blanks into paperboard container products presents a variety of disadvantages and drawbacks that have a tendency to reduce the useful life of the ring heaters. This thus requires that they be replaced on an excessively frequent basis. The need for repairing or replacing damaged ring heaters and/or ring heater wires also presents a further significant problem relating to productivity. As noted above, each die set consisting of an upper die and a lower die typically includes three or four ring heaters, two ring heaters in the lower die and one or two ring heaters in the upper die. Typically, there are 4–7 die sets per press so that 4–7 paperboard container products can be produced during each cycle of the press. Thus, there are approximately 12–28 ring heaters per press. If one ring heater or ring heater wire breaks down or fails, the entire press has to be stopped so that the ring heater or wire can be replaced. This of course shuts down all of the other die sets in the press which can have a significant adverse impact on productivity. If the press is operating at full capacity, shutting down the press for even a relatively short period of time necessarily results in a significant reduction in production. If it is necessary to increase production at another facility (or at the same facility assuming the affected press is not operating at full capacity) to make up for the press down-time, it may be necessary to incur added expense (e.g., overtime for the press operators), thus further increasing the costs associated with making paperboard container products.

In light of the foregoing, a need exists for a pressing apparatus that is able to press form a paperboard blank into a food service paperboard container without the disadvantages and drawbacks associated with current apparatus.

A need also exists for such a pressing apparatus that is not susceptible to the excessive amount of operational difficulties and manufacturing downtime as current pressing apparatus.

It would also be desirable to provide a pressing apparatus that provides a more efficient heat transfer to the die to negate the need for operating the heater at an excessively high wattage.

SUMMARY OF THE INVENTION

In light of the foregoing, one aspect of the present invention includes a pressing apparatus for producing a food service paperboard container from a paperboard blank so that the paperboard container possesses an overturned rim provided with folds. The apparatus includes a first die and a second die that are movable relative to one another. The first die includes a first base and a first platform that is movable with respect to the first base, with the first base having a curved surface for engaging the outer periphery of the paperboard blank. The second die is positioned in opposing relation to the first die and includes a second base and a second platform that is movable with respect to the second base. The second die is movable with respect to the first die and the second base has a curved surface for engaging the outer periphery of the paperboard blank so that the outer periphery of the paperboard blank is pressed between the curved surface of the first base and the curved surface of the second base. A first cast-in heater is mounted within a recess in the first die and includes a tubular heating element comprised of an electrically insulated resistor wire and metal casing or housing embedded within a thermally conductive cast-in material. A second cast-in heater is mounted within a recess in the second die and includes a tubular heating element comprised of an electrically insulated resistor wire and metal casing or housing embedded within a thermally conductive cast-in material.

Another aspect of the invention involves a pressing apparatus for pressing a paperboard blank to produce a food service paperboard container having an overturned rim provided with folds. The apparatus includes a first die having a curved pressing surface and a second die positioned in opposing relation to the first die and having a curved pressing surface. At least one of the first and second dies is movable relative to the other so that the outer periphery of the paperboard blank is pressed between the curved pressing surface of the first die and the curved pressing surface of the second die. At least one cast-in heater is mounted either the first die or the second die to heat the pressing surface of the respective die.

BRIEF DESCRIPTION OF THE DRAWING FIGURES

The features and characteristics associated with the present invention will become more apparent from the following detailed description considered with reference to the accompanying drawing figures in which like elements are designated by like reference numerals and wherein:

FIG. 20 is a table setting forth the results of a break-even analysis involving the replacement of ring heaters with cast-in heaters in a three ring heater system;

FIG. 21 is a table setting forth the results of a break-even analysis involving the replacement of ring heaters with cast-in heaters in a four ring heater system;

DETAILED DESCRIPTION OF THE INVENTION

The pressing apparatus according to the present invention is specifically adapted for use in press forming paperboard blanks into paperboard container products such as paper trays, plates, bowls, platters and the like from a paperboard blank through the application of heat and pressure to the paperboard blank. U.S. Pat. Nos. 4,721,500, 4,609,140, 4,721,499, 5,088,640, 5,326,020, 4,832,676 and 4,606,496, the entire content of each of which is incorporated herein by reference, describe methods of press forming paperboard blanks into paperboard container products as well as apparatus used to form such paperboard container products and paperboard container products formed by such methods and apparatus. The pressing apparatus of the present invention is designed to be used to carry out these methods and produce these products. Before looking specifically at the heater device of the present invention that is used in a pressing apparatus, a brief description of the general method used to press form a paperboard blank into a paperboard container product will be described.

Figure 3A:
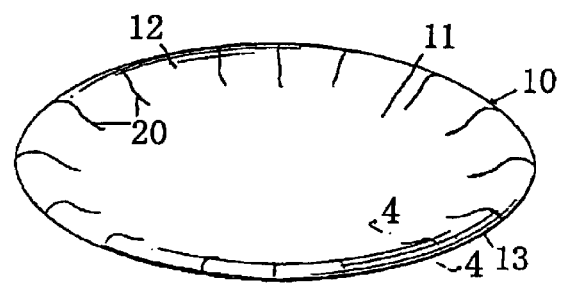
FIGS. 3A–3D are perspective views of examples of various types of food serving paperboard container products that can be made employing the heater device of the present invention.

As seen with reference to FIG. 3A, one example of a paperboard container product that can be press formed through use of the apparatus and method of the present invention is a plate 10 having a substantially flat circular bottom wall portion 11, an upturned sidewall portion 12, and an overturned rim portion 13 extending from the sidewall. The plate portions 11, 12, 13 are formed integrally with one another. It is to be understood that plate shapes other than that shown in FIGS. 3 and 4 can be produced, such as plate shapes similar to those shown in the aforementioned U.S. patents.

Figure 4:
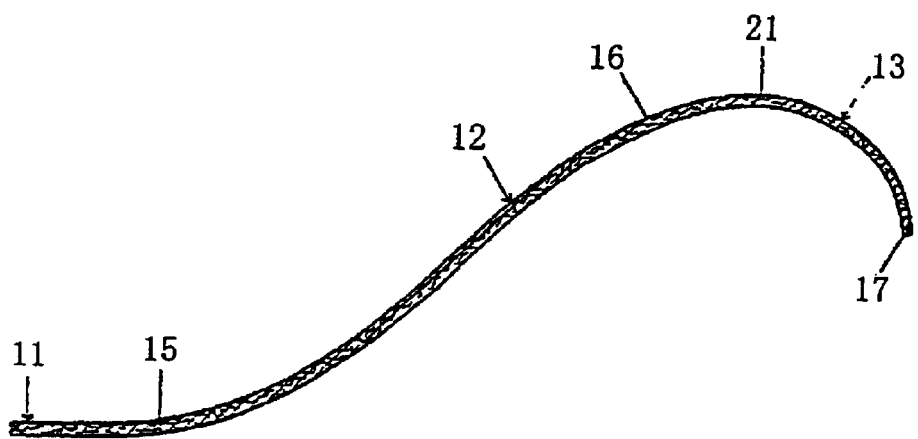
FIG. 4 is a cross-sectional view of a portion of one possible food serving paperboard container product shown in FIG. 3A taken along the section line 4—4.

As best seen in FIG. 4, the flat bottom wall portion 11 of the plate extends to about the position in the plate denoted at 15 at which the sidewall 12 begins rising upwardly. The upturned sidewall 12 terminates at about the position marked 16 in FIG. 4 at which the paperboard begins to curve over and down about a smaller radius to form the overturned rim 13 which terminates at a peripheral rim edge 17.

As described in U.S. Pat. No. 4,609,140, the rim 13 serves a variety of advantageous purposes in the paperboard product. The rim provides an esthetically pleasing appearance, while at the same time, providing a generally lateral area for gripping by the user when carrying the plate. Perhaps most importantly, the rim 13 imparts rigidity and bending resistance characteristics to the plate when the plate is held by a user. As further described in the aforementioned U.S. Pat. No. 4,609,140, the paperboard plate 10 is formed from a unitary flat blank of paperboard stock, either scored or unscored. Thus, during formation of the paperboard container product from the flat blank of paperboard stock, the flat blank of paperboard stock must undergo folding in the sidewall 12 and the rim 13. The resulting fold lines are shown for purposes of illustration at 20 in FIG. 3A.

Figure 5:
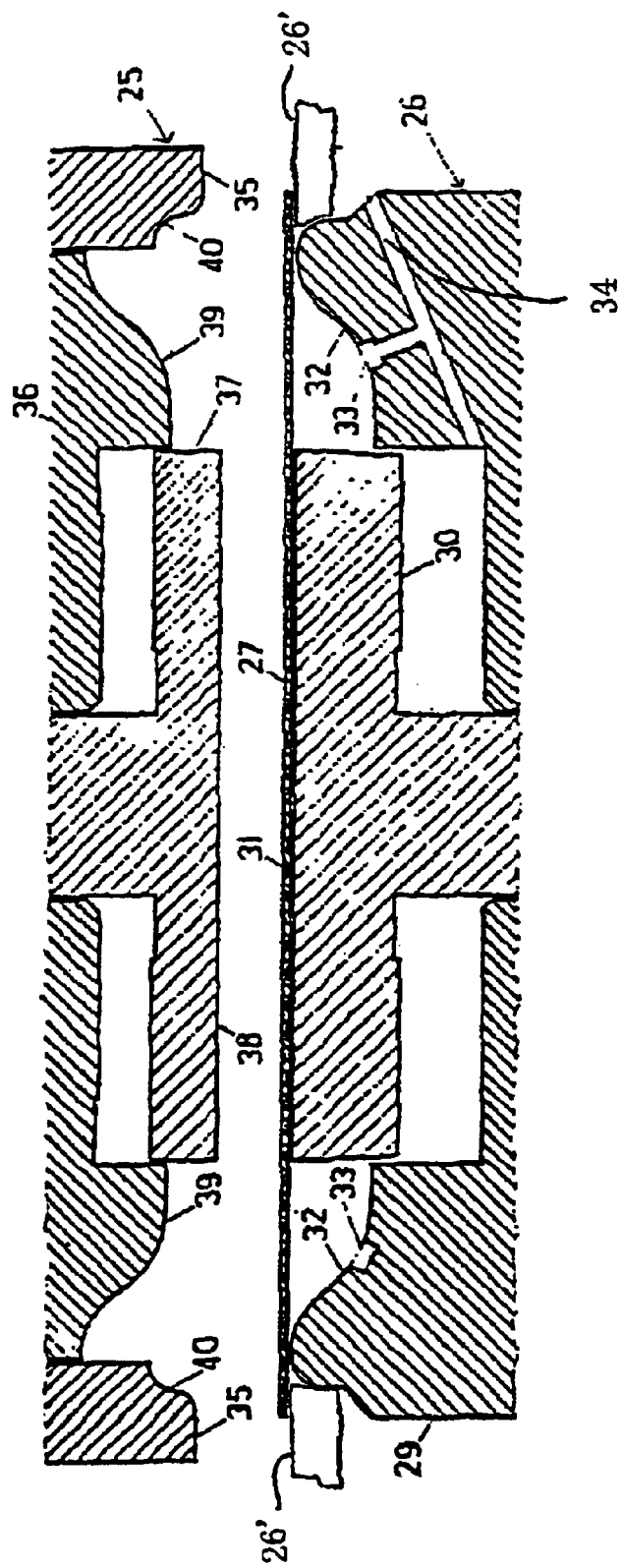
FIG. 5 is a cross-sectional view of a portion of one example of a pressing apparatus in which the heater device of the present invention can be employed.

To form the flat blank of paperboard stock into the paperboard plate shown in FIGS. 3 and 4, a die set or pressing apparatus similar to that illustrated in FIG. 5 can be employed. The die set includes a metal pressware die set defined by an upper die 25 and a lower die 26 which are adapted to press a flat, circular paperboard blank 27 into the configuration of the plate 10 shown in FIG. 3A. To allow the paperboard blank 27 to be held and subsequently shaped by the die set shown in FIG. 5, the upper and lower dies are segmented.

The lower die 26 possesses a circular base portion 29 and a central circular platform 30 which is mounted to be movable with respect to the base portion 29. The platform 30 is cam or pneumatically operated in a conventional manner and urged towards a normal position such that its flat top forming surface 31 is located initially above the forming surfaces 32 of the base 29. The platform 30 is adapted to be moved relative to the base 29, with the entire base 29 itself being mounted in a conventional manner on springs or a hydraulic cylinder (not shown). The paperboard blank 27 is adapted to be very tightly pressed at the peripheral rim area during the press forming operation and so it may be difficult for moisture in the paperboard which is driven therefrom during pressing to readily escape. To facilitate the release of this moisture, at least one circular groove 33 can be provided in the surface 32 of the base, with this groove 33 venting to the atmosphere through a passageway 34. The lower die may also be provided with a spring-biased circular clamp ring 26' around the base portion 29, which retracts during pressing, to further control the paperboard blank formation into the final plate product.

The top die 25 is also segmented into an outer ring portion 35, a base portion 36 and a central platform 37 having a flat forming surface 38. The base portion has curved, symmetrical forming surfaces 39 and the outer ring possesses curved forming surfaces 40. The central platform 37 and the outer ring 35 are slidingly mounted to the base 39 and biased by springs or hydraulic cylinder (not shown) to the normal position shown in FIG. 5 in a commercially conventional manner. The die 25 is mounted for reciprocating movement towards and away from the lower die 26.

During the pressing operation, the blank 27 is laid upon the flat forming surface 31, generally underlying the bottom wall portion 11 of the plate to be formed. The forming surface 38 first makes contact with the top of the blank 27 to hold the blank in place as the forming operation begins. Further downward movement of the die 25 brings the spring biased forming surfaces 40 of the outer ring 35 into contact with the edges of the blank 27. This thus begins to shape the edges of the blank over the underlying surfaces 32 in the areas which will define the overturned rim 13 of the finished plate. However, because the ring 35 is spring biased, the paperboard material in the rim area is not substantially compressed by the initial shaping. This is because the force applied by the forming surfaces 40 is relatively light and limited to the spring force applied to the ring 35. Eventually, the die 25 moves sufficiently far down so that the platform segments 30, 37 and the ring 35 are fully compressed such that the adjacent portions of the forming surfaces 38, 39 are coplanar and the adjacent portions of surfaces 39, 40 are coplanar, and similarly that the forming surface 31 is coplanar with the adjacent portion of the forming surfaces 32. The upper die 25 continues to move downwardly and thus drives the entire lower die 26 downwardly against the force of the springs or hydraulic cylinder which support the die 26. At the full extent of the downward stroke of the upper die 25, the dies exert a force on each other, through the formed blank 27 which separates them, which is equal to the force applied by the compressed springs or hydraulic cylinder supporting the die 26. Thus, the amount of force applied to the formed blank 27 and distributed over its area can be adjusted by changing the length of the stroke of the upper die 25 or hydraulic cylinder pressure.

Figure 6:
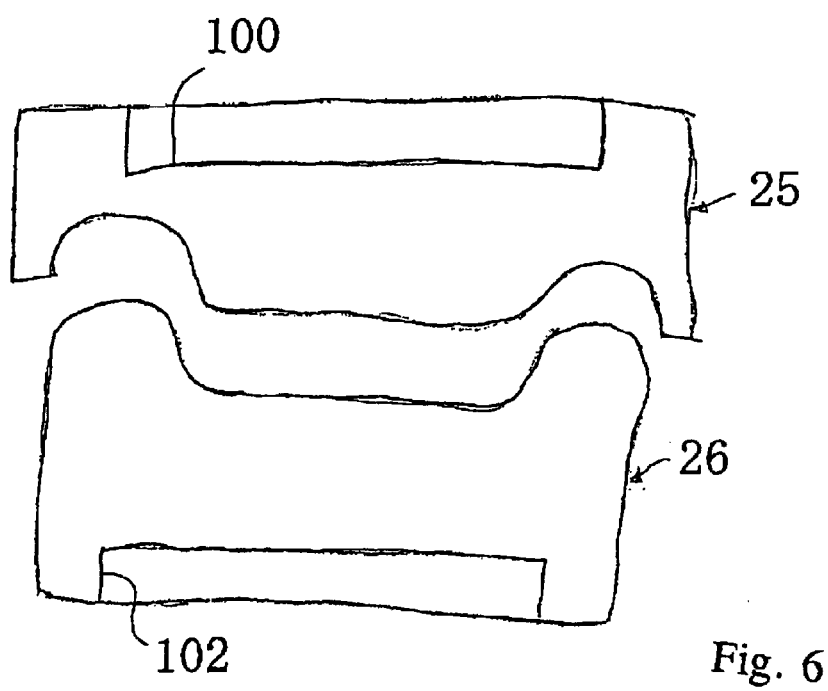
FIG. 6 is a simplified schematic illustration of the pressing apparatus shown in FIG. 5 illustrating how the heater device of the present invention is mounted.

FIG. 6 schematically illustrates the upper and lower dies corresponding to the upper and lower dies 25, 26 described above and shown in FIG. 5, except that the heated pressing surfaces for forming the paperboard product container are illustrated in FIG. 6 in a simplified manner for purposes of ease in understanding. It is to be appreciated that the upper and lower dies 25, 26 may have a construction that is similar to that shown in FIG. 5. It is to be understood that the heater device of the present invention can be used in a variety of different pressing apparatus that are specifically adapted to form food service paperboard container products, including those apparatus described in the aforementioned patents. Thus, as person skilled in the art will readily recognize, the pressing apparatus in which the heater device of the present invention is employed can have configurations different from that shown in FIG. 5, depending upon a variety of factors such as, for example, the shape and configuration of the paperboard container product being formed.

The upper die 25 is provided with a recessed area 100 for receiving a heater device in accordance with the present invention. Similarly, the lower die 26 is provided with a recessed area 102 for receiving a heater device in accordance with the present invention.

Figure 7:
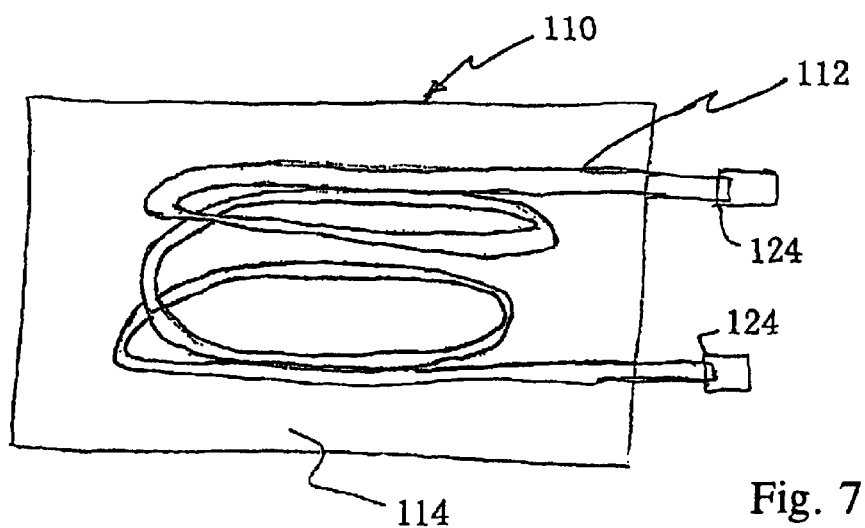
FIG. 7 is a general cross-sectional view of the heater device according to present invention that is employed in the heating apparatus.

The heater device 110 used in the paperboard product container pressing apparatus of the present invention is illustrated in FIG. 7 and is in the form of a cast-in heater. It is to be understood that the illustration in FIG. 7 represents an enlarged depiction of the heater device or cast-in heater 110 of the present invention. The cast-in heater 110 illustrated in FIG. 7 is actually sized, dimensioned and configured to fit within the recesses 100, 102 in the upper and lower dies 25, 26.

As mentioned above, the heater device 110 of the present invention is in the form of a cast-in heater. The cast-in heater 110 includes a tubular element or heating element 112 that is embedded within a cast-in material 114. The cast-in material is a thermally conductive material, preferably a ferrous or non-ferrous based alloy including an iron-based alloy, an aluminum-based alloy, a copper-based alloy, a magnesium-based alloy, a nickel-based alloy or a titanium-based alloy. The cast-in heater 110 is fabricated by placing the heating element 112 within a mold in which is then cast the cast-in material.

Figure 8:
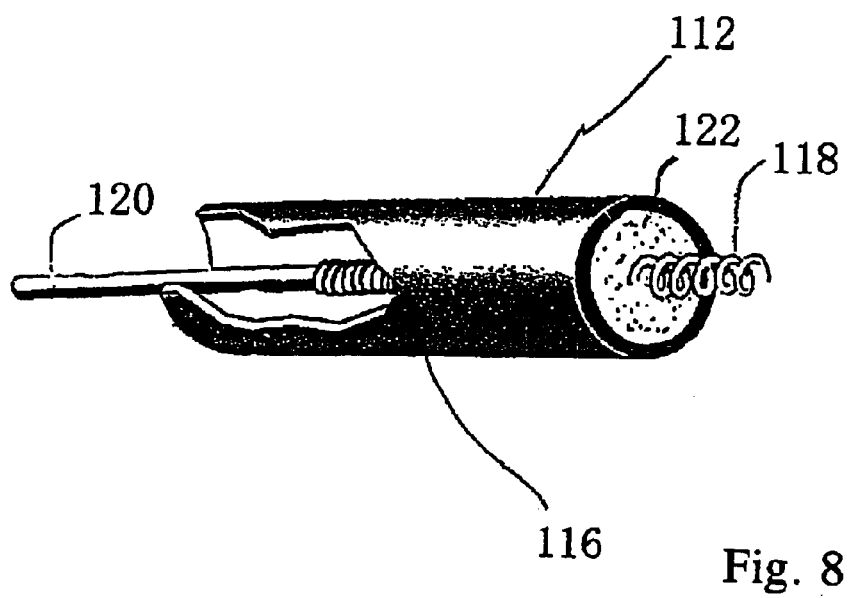
FIG. 8 is a perspective view of the tubular heating element employed in the ter device of the present invention.

As seen in FIG. 8, the heating element 112 includes an outer sheath 116, and a helically coiled resistor wire 118. The opposite ends of the resistor wire 118 are each connected to a respective terminal pin 120, only one of which is shown in FIG. 8. The sheath 116 is commonly produced from steel or Incoloy alloy stainless steel materials. The resistor wire 118 is commonly made from nickel-chromium (nichrome) metal. The resistor wire 118 forms an internal electrical resistive element that is bent or wound to a predetermined length and pattern to obtain the necessary heating wattage and uniformity for the cast-in heater. The helically coiled resistor wire 118 and the terminal pin 120 are positioned within the sheath 116. In addition, a compacted refractory material 122 is packed within the sheath 116 so as to tightly surround the helically coiled resistor wire 118 and the terminal pin 120. The refractory material is typically magnesium oxide.

It is to be understood that the sheath 116 can be made of a material other than Incoloy, such as steel or copper, for example. The resistor wire 118 is preferably welded or otherwise joined to the terminal pin 120 to assure a positive connection. The resistor wire 118 is also centered within the sheath 116 and insulated by the compacted magnesium oxide refractory material which functions as an electrical insulator. This material rapidly conducts heat from the coiled resistor 118 to the sheath 116 so that the heat can then be transferred to the cast-in material 114 in which is embedded the heating element 112. The final casting can then be machined for mounting and clearance holes, and also finished to provide good thermal contact between the heater and the upper/lower die.

The ends of the sheath 116 can be sealed around the terminal pin 120 outside the cast-in heater through the use of a moisture resistant potting material (e.g., silicone or epoxy resin) to provide an outside wire connection that prevents the ingress of the water into the cast-in heater. The tubular element extends outside the die set, with the terminal pins 120 each being connected to a wire to provide the necessary electrical connection.

Figure 9:
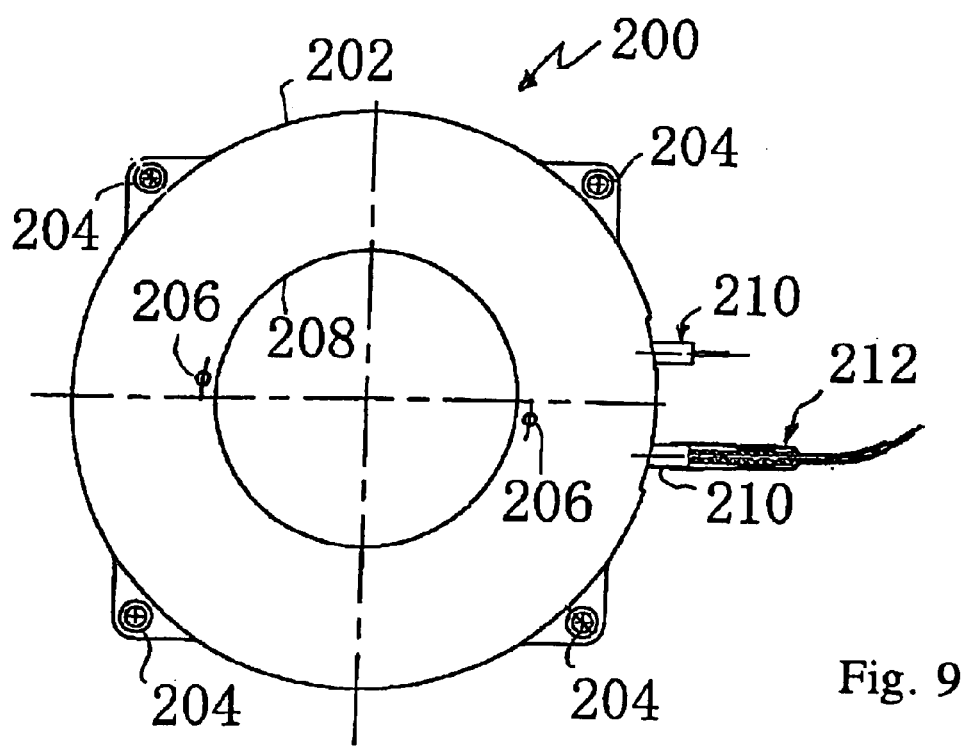
FIG. 9 is a plan view of one preferred version of the cast-in heater according to the present invention.
Figure 10:
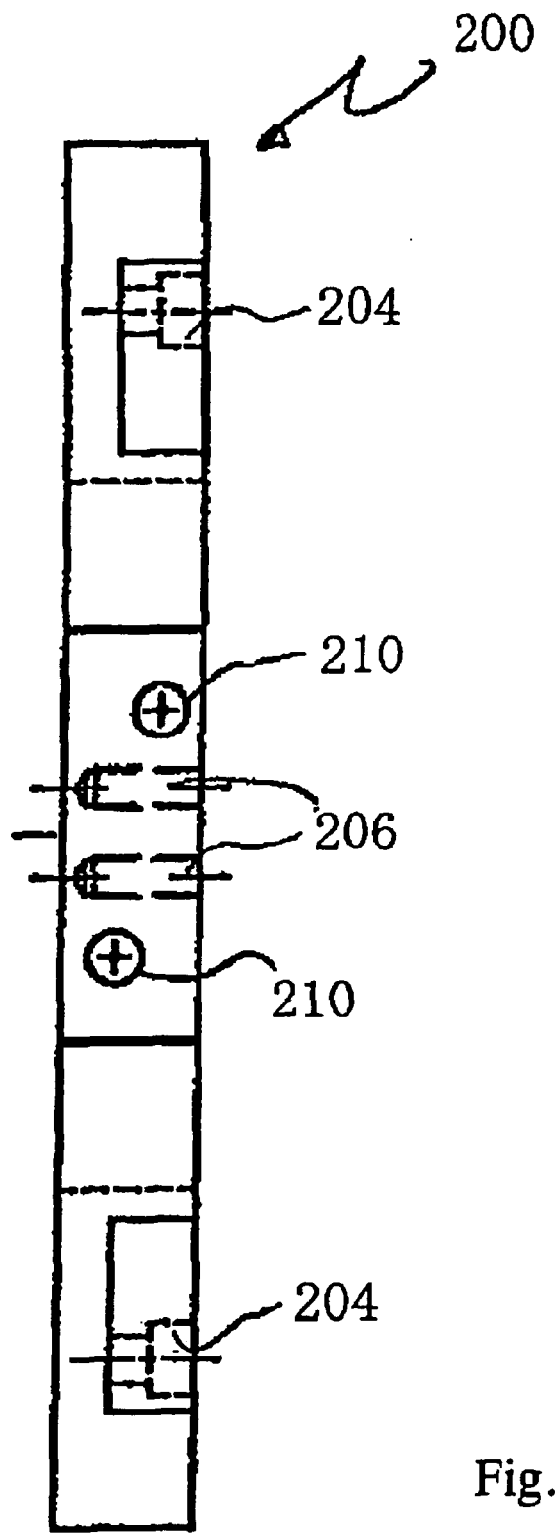
FIG. 10 is a side view of the cast-in heater shown in FIG. 9.

FIGS. 9 and 10 illustrate features associated with a preferred form of the cast-in heater according to the present invention. This cast-in heater 200 is constructed to be used in existing dies having a pair of ring heaters, although the cast-in heater 200 can be used in other contexts as well. The cast-in heater 200 includes cast-in material 202 (i.e., a thermally conductive material, preferably a ferrous or non-ferrous based alloy including an iron-based alloy, an aluminum-based alloy, a copper-based alloy, a magnesium-based alloy, a nickel-based alloy or a titanium-based alloy) and a heating element similar to that described above and shown in FIGS. 7 and 8 which is comprised of a helically coiled resistor wire enclosed within an outer sheath. The cast-in heater 200 is provided with a plurality of mounting holes 204 that allow the cast-in heater to be mounted and secured in place in the die. The mounting holes 204 may be positioned for alignment with existing holes in an existing press forming apparatus (e.g., holes previously used to secure a clamp plate for holding the ring heaters in place), thus allowing the cast-in heater to be mounted in an existing press forming apparatus without modification.

The cast-in heater is also provided with a pair of threaded holes 206 that are adapted to receive threaded bolts. The purpose of the threaded bolts is to allow the cast-in heater to be more easily removed from the die. By threading screws into the threaded holes 206, an individual can grasp the screws and pull the cast-in heater out of the die. A centrally located through hole 208 is provided in the cast-in heater to accommodate certain parts of the die in which the cast-in heater is mounted as will be described in more detail.

The cast-in heater also includes a pair of outside wire connections that are adapted to be connected to a power source. These outside wire connections are connected to the terminals 210 of the heating element that is embedded within the cast-in material 202. Although FIG. 9 illustrates an outside wire connection connected to one of the heating element terminals 210, it is to be understood that a similar outside wire connection is also provided at the other heating element terminal 210. As seen in FIG. 10, the two terminals 210, 210, and thus the two outside wire connections 212, are located at different levels. This allows a greater length of the heating element to be located within the heater, thus also increasing the wattage.

Figure 11:
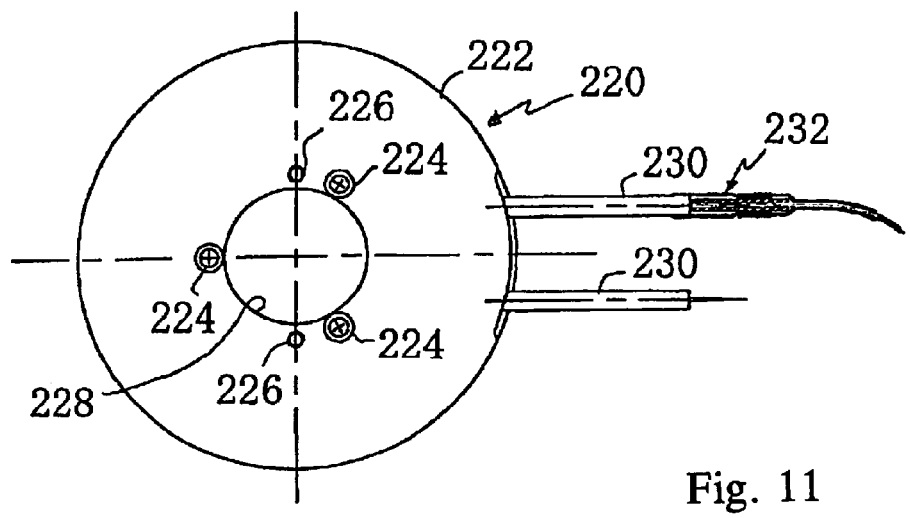
FIG. 11 is a plan view of another preferred version of the cast-in heater according to the present invention.
Figure 12:
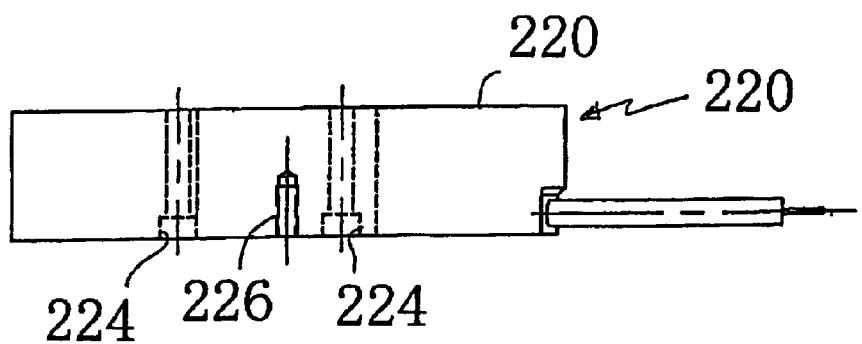
FIG. 12 is a side view of the cast-in heater shown in FIG. 11.

FIGS. 11 and 12 show another preferred form of the cast-in heater 220. This cast-in heater is constructed to be used in existing dies having only a single ring heater, although the cast-in heater 220 can be used in other contexts as well. The cast-in heater 220 shown in FIGS. 11 and 12 includes cast-in material 222 as well as the heating element similar to that shown in FIG. 8 that is embedded within the cast-in material.

The version of the cast-in heater shown in FIGS. 11 and 12 includes a plurality of mounting holes 224 for mounting the cast-in heater in the die, several threaded holes 226 that are adapted to receive threaded screws for facilitating removal of the cast-in heater 220 from the die and a centrally located through hole 228 for accommodating working portions of the die. Further, the cast-in heater 220 includes an outside wire connection 232 connected to each of the terminals 230, 230 of the heating element. Although FIG. 11 illustrates an outside wire connection 232 connected to one of the heating element terminals 230, it is to be understood that a similar outside wire connection is also provided at the other heating element terminal 230. The outside wire connections 232 are similar to those described above in connection with the embodiment illustrated in FIGS. 9 and 10, except that the outside wire connections 232 are located at the same level.

Figure 13:
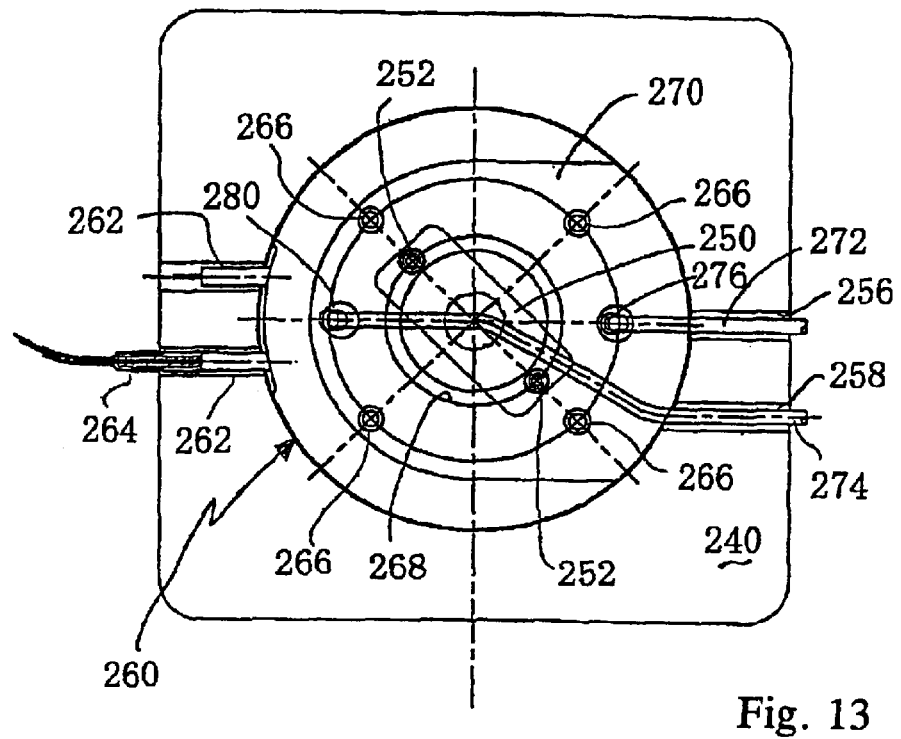
FIG. 13 is a plan view of a cast-in heater according to the present invention mounted in an upper die.
Figure 14:
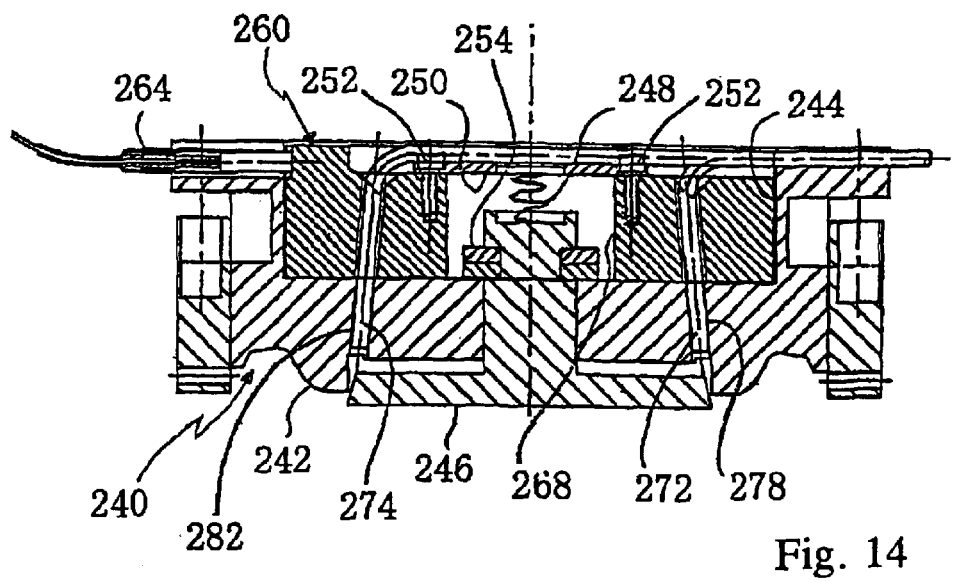
FIG. 14 is a cross-sectional view of the die and cast-in heater shown in FIG. 13.

FIGS. 13 and 14 illustrate a cast-in heater in accordance with the present invention mounted in a die of a die set. In the illustrated embodiment, the die is the upper punch die. The die 240 includes a forming surface 242 on one face of the die and a cavity 244 on the opposite face of the die. The die is also provided with a knockout punch 246 that is spring biased by way of a spring 248. The spring 248 is biased between the knockout punch 246 and a plate 250 that is secured to the cast-in heater 260 by way of several screws 252. The spring 248 biases the knockout punch 246 in a direction that causes the front surface of the knockout punch 246 to extend beyond the forming surface 242 of the die 240. As an alternative to spring biasing the knockout punch 246, it is also possible to eliminate the spring and allow the knockout punch 246 to operate by gravity. The movement of the knockout punch 246 is limited by a stopper 254 that is secured to a reduced diameter portion of the knockout punch 246 for engaging the bottom of the cavity 244. As illustrated in FIGS. 13 and 14, the top surface of the die 240 is also provided with a pair of recesses 256, 258 that are adapted to receive air tubing, the purpose of which will be described in more detail below.

The cast-in heater 260 is constructed in a manner similar to that described above in connection with the various other versions of the cast-in heater, and includes an outside wire connection 264 connected to each of the terminals 262, 262 of the heating element that is embedded within the cast-in material. Although FIG. 13 only illustrates an outside wire connection 264 connected to one of the heating element terminals 262, it is to be understood that a similar outside wire connection is provided at the other heating element terminal.

The cast-in heater is provided with a plurality of mounting holes 266 for mounting the cast-in heater 260 within the cavity 244 of the die 240. A central hole 268 is provided in the cast-in heater to accommodate the knockout punch 246. The upper surface of the cast-in heater 260 is provided with a recess 270 that opens towards the side of the upper die surface at which is located the two recesses 256, 258. This recess 270 in the upper surface of the die 260 is designed to accommodate a pair of air tubes 272, 274.

One of the air tubes 272 is situated in the recess 256 in the upper die surface, extends across the recess 270 in the upper heater surface and is then angled downwardly where it extends through a through hole 276 in the cast-in heater and into a communicating through hole 278 in the upper die as shown in FIG. 14. The other air tube 274 is situated in the other recess 258 in the upper die surface, extends across the recess 270 in the upper heater surface, and then extends downwardly through a hole 280 in the cast-in heater and into a communicating hole 282 in the upper die as also shown in FIG. 14.

As can be seen from FIG. 14, the air tubes 272, 274 extend into the upper die 240 and terminate towards the region adjacent the periphery of the knockout punch 246. It has been found in some applications that once the container has been pressed formed, the just-formed container may have a tendency to not fall freely away from the forming surface 242 of the die 240. When the upper die is lifted away from the lower die, the biasing force of the spring 248 or gravity moves the knockout punch 246 into engagement with the just-formed container to separate the just-formed container from the forming surface. It has been found, however, that the force associated with the knockout punch may not always be sufficient to quickly separate the just-formed container from the forming surface 242 of the die 240. Air is thus conveyed through the air tubes 272, 274 to provide an additional mechanism for separating the just-formed container from the forming surface.

Figure 15:
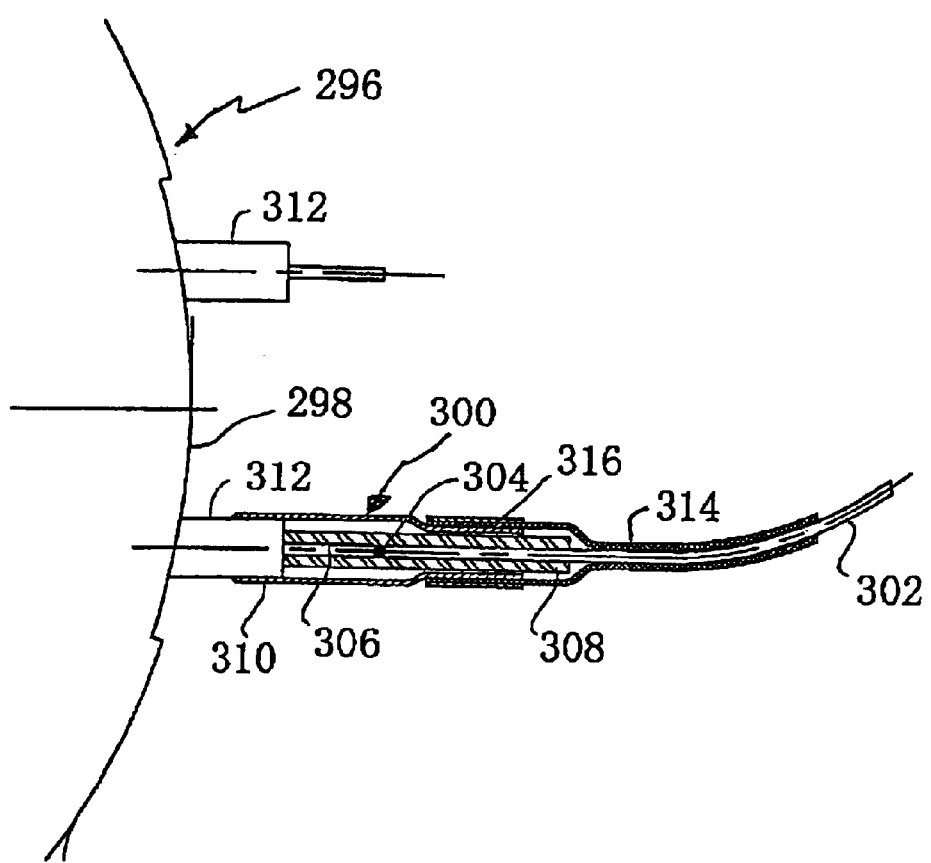
FIG. 15 is an enlarged cross-sectional view of the wire connection usable in conjunction with the various versions of the cast-in heater according to the present invention.

FIG. 15 illustrates in more detail an example of one outside wire connection that is suitably used in connection with the various embodiments of the cast-in heater described above to connect the heating element terminal to the power source. The wire connection is advantageously designed to minimize wire breakage while also providing safety against electrical shock. The outside wire connection 300 includes a standard stranded electrical wire 302 that is soldered at 304 to the pin 306 of the heating element. The pin 306 corresponds to the pin 120 described above and illustrated in FIG. 8. An insulation sleeve 308 surrounds the pin 306, the solder connection 304 and a portion of the electrical wire 302. A tubular metal connector 310 surrounds the insulation sleeve 308 and is fixed to the heating element terminal 312 extending out of the cast-in material 298 of the cast-in heater 296. The stainless steel overbraid mesh 314 overlaps a portion of the tubular metal connector 310, surrounds the end portion of the insulation sleeve 308, and surrounds a portion of the electrical wire 302. A crimp sleeve 316 is fitted over the portion of the stainless steel overbraid mesh 314 that overlaps the tubular metal connector 310. The crimp sleeve 316 is then crimped to secure together the stainless steel overbraid mesh 314 with the tubular metal connector 310. As mentioned above, by virtue of this construction, the potential for wire breakage is minimized by virtue of this construction. In addition, this wire connection is relatively safe against electrical shock. It is to be understood that although FIG. 15 shows the wire connection applied to only one of the heating element terminals 312, a similar wire connection is provided on the other heating element terminal 312. Other electrical connection techniques can be advantageously employed.

Figure 3B:
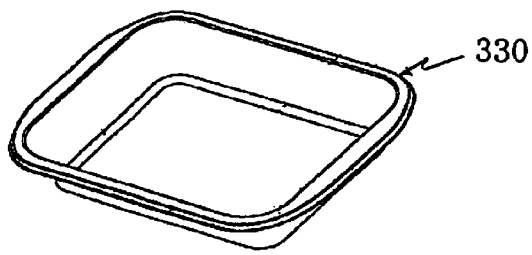
Figure 3C:
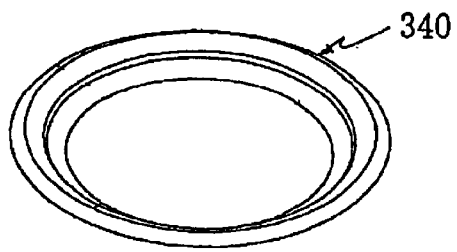
Figure 3D:
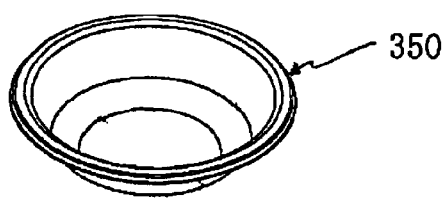

FIGS. 3B–3D illustrate examples of other types of paperboard containers that can be fabricated using the press forming apparatus of the present invention. FIG. 3B illustrates a tray type of container, FIG. 3C illustrates a plate type of container, and FIG. 3D illustrates a bowl type of container. It is to be understood that other types of containers are also possible.

Figure 1:
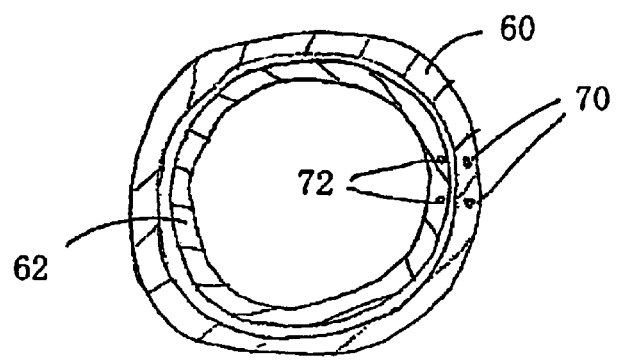
FIG. 1 is a plan view of a nested pair of ring heaters typically used in pressing apparatus that press form a paperboard blank into paperboard container products.
Figures 2A, 2B:
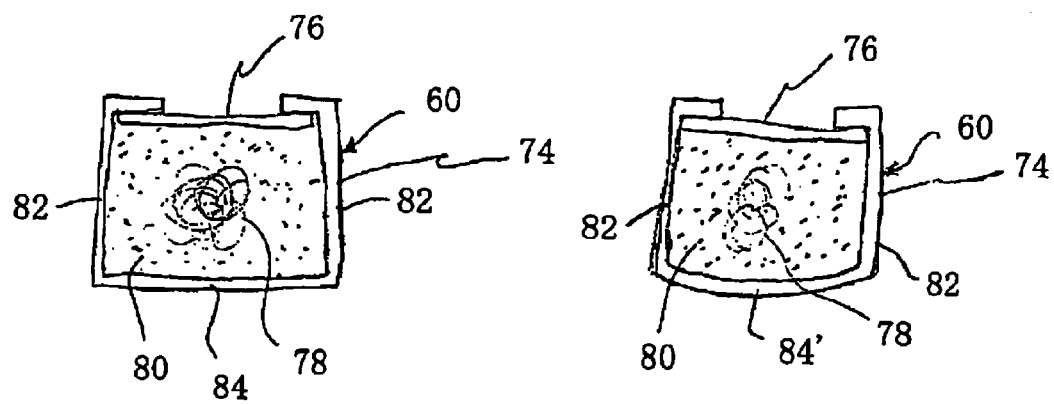
FIG. 2A is a cross-sectional view of one of the ring heaters shown in FIG. 1.
FIG. 2B is a cross-sectional view similar to FIG. 2A, but illustrating the ring heater when the bottom wall of the sheath has been distorted.

It has been found that a single cast-in heater in accordance with the present invention can be used to replace two nested ring heaters. Because of the tubular construction of the heating element that is embedded within the cast-in material, the ingress of water into the cast-in heater is highly unlikely to occur. Thus, the distortion problems described above and illustrated in FIG. 2B are not likely to arise. It is thus possible to maintain much flatter surfaces on the cast-in heater. Consequently, the cast-in heater need not run at such high wattage as the ring heaters. In fact, the cast-in heaters can be operated at significantly lower wattage, while still achieving the necessary temperature at the die surface. The superior heat transfer properties of the cast-in heaters versus ring heaters contribute to this ability to achieve the necessary temperature of the die surface while being able to operate the cast-in heaters at a lower wattage.

Figure 16:
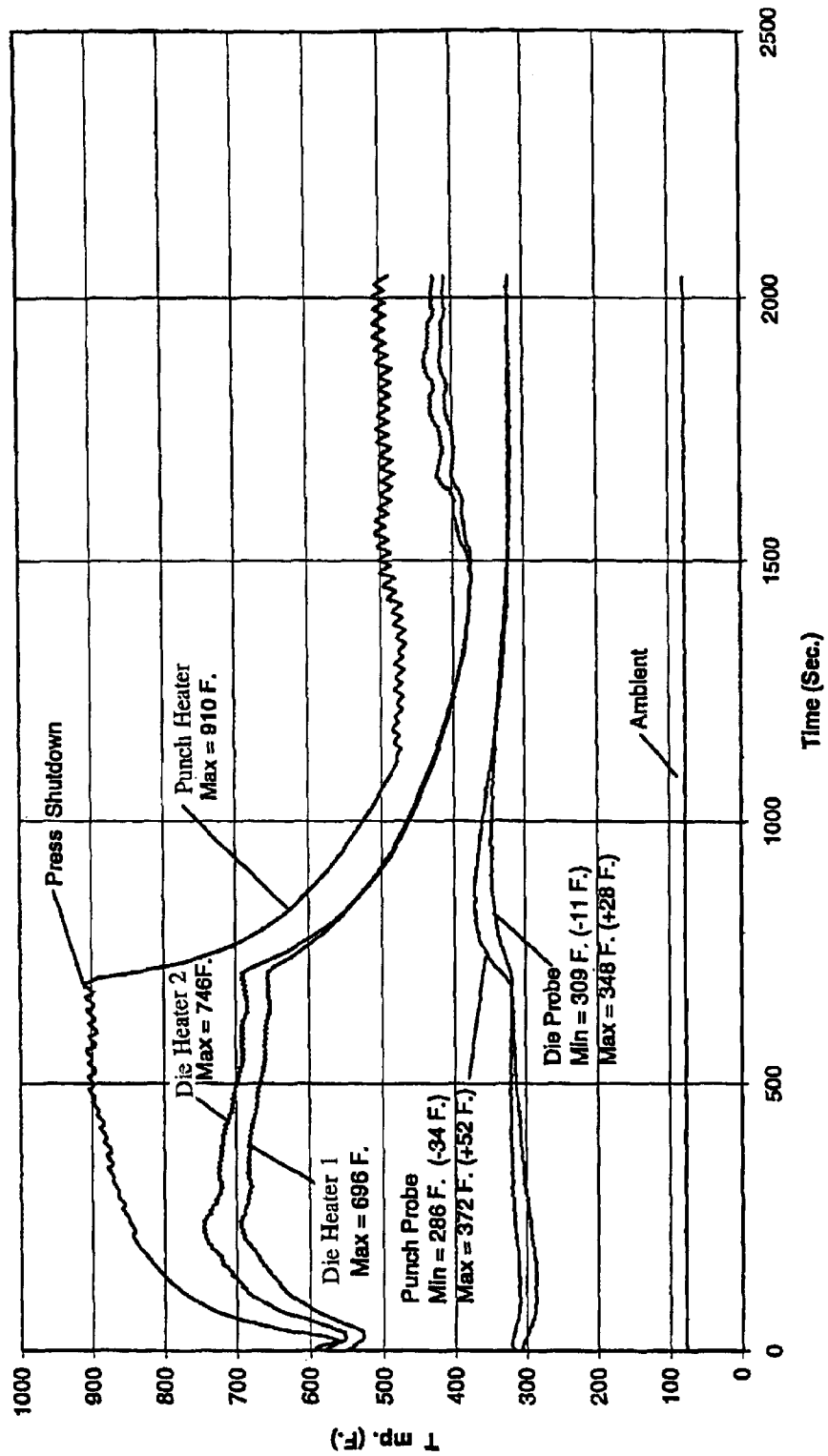
FIG. 16 is a graph illustrating temperature data at various parts of a press forming apparatus employing ring heaters during production and shutdown of the apparatus.
Figure 17:
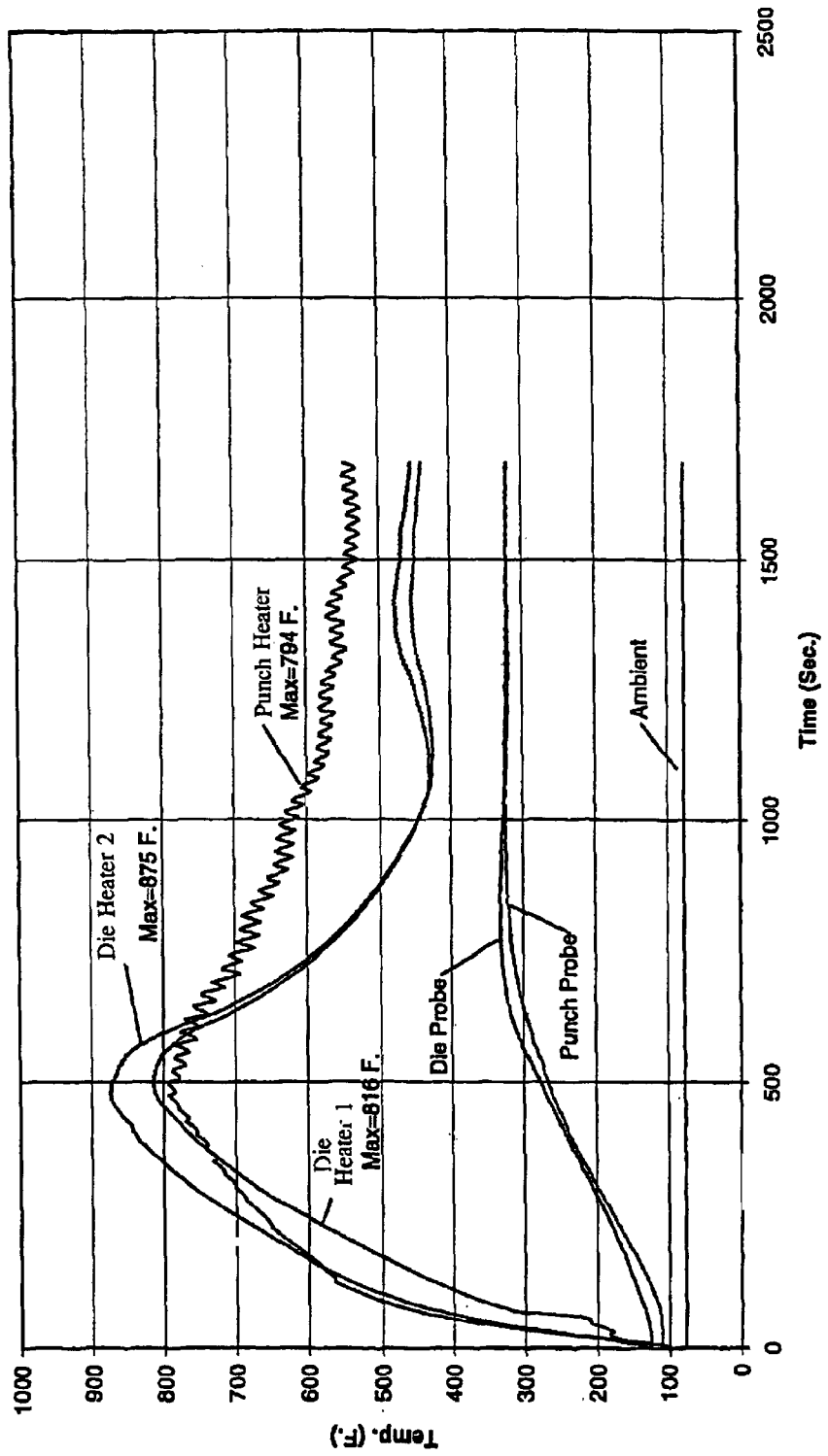
FIG. 17 is a graph illustrating temperature data at various parts of a press forming apparatus employing ring heaters during standard heat-up of the apparatus.
Figure 18:
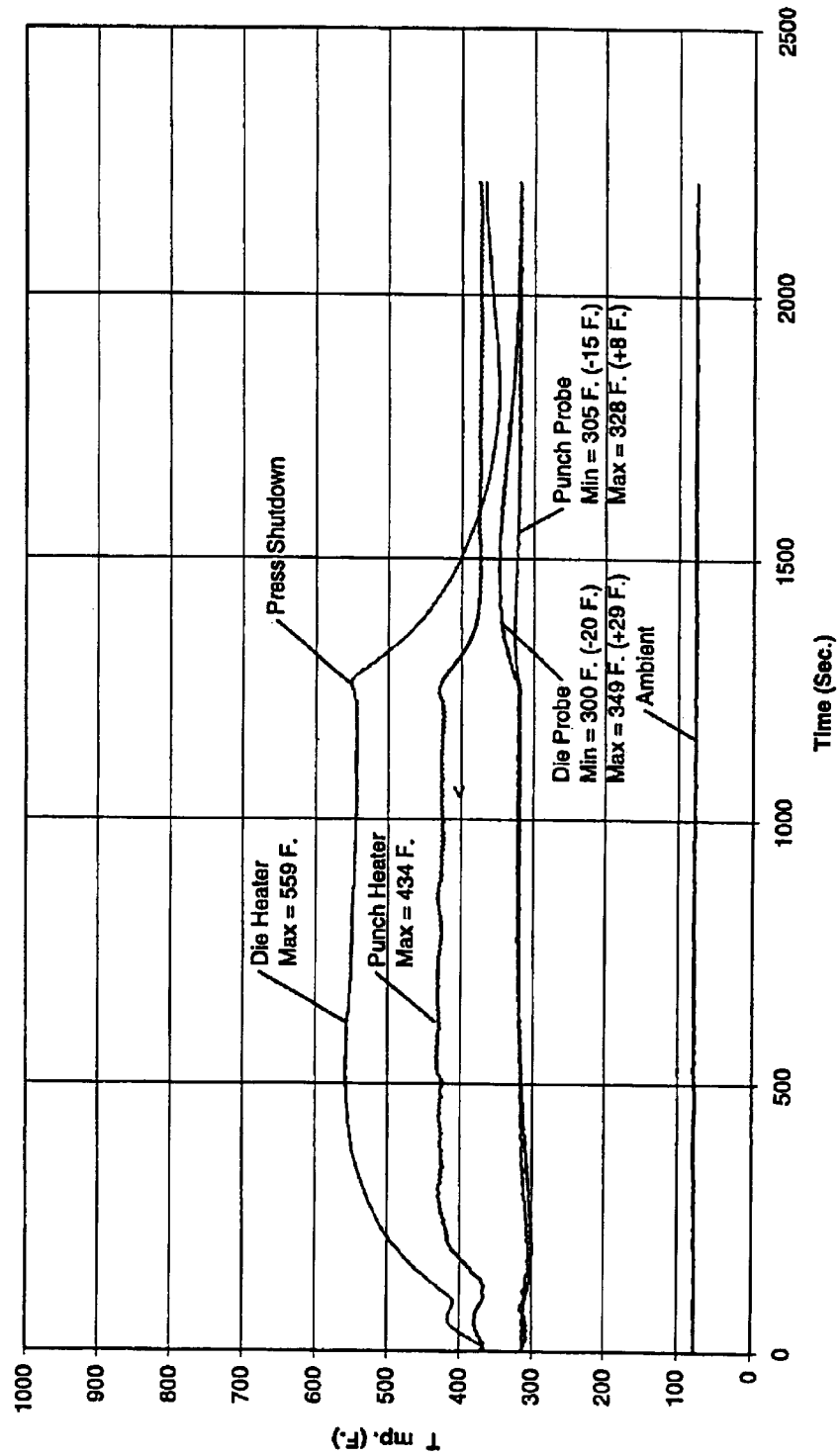
FIG. 18 is a graph illustrating temperature data at various parts of a press forming apparatus employing cast-in heaters during production and shutdown of the apparatus.
Figure 19:
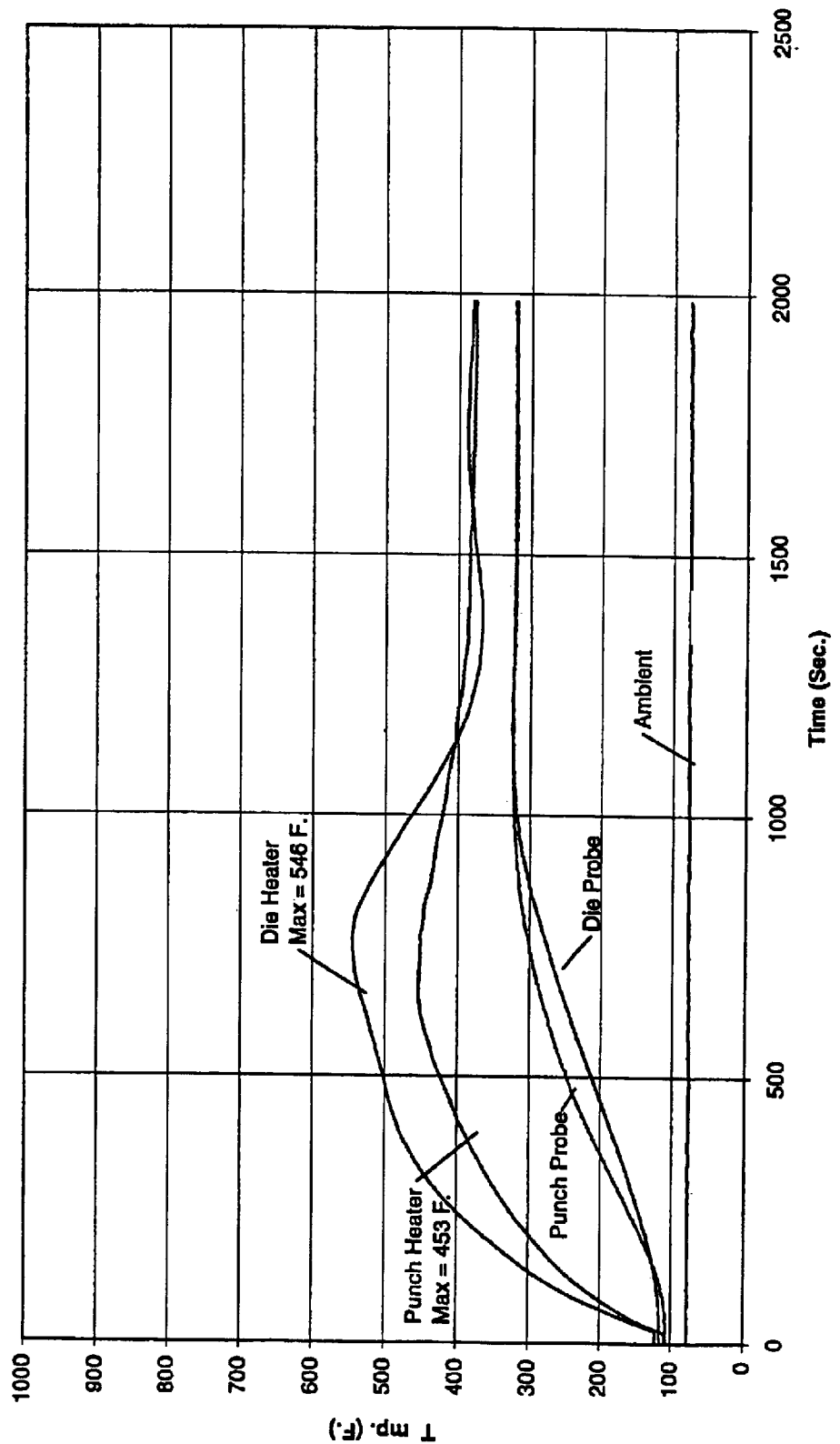
FIG. 19 is a graph illustrating temperature data at various parts of a press forming apparatus employing cast-in heaters during standard heat-up of the apparatus.

FIGS. 16–19 illustrate in graphical terms the significant benefits associated with the use of cast-in heaters in accordance with the present invention. The graphs in FIGS. 16 and 17 provide temperature versus time data at various locations of a press forming apparatus employing ring heaters. The press forming apparatus employing ring heaters required a total of three ring heaters, two on the lower die and one on the upper die. The graphs in FIGS. 18 and 19 provide temperature versus time data at various locations of a press forming apparatus employing cast-in heaters in accordance with the present invention. The press forming apparatus employing cast-in heaters required a total of two cast-in heaters, one on the lower die and one on the upper die.

The temperature data set forth in the graphs was obtained from several thermocouples mounted in the die sets. With respect to the graphs of FIGS. 16 and 17, one thermocouple, identified as the punch probe in the graphs, was placed within the upper die towards the upper die forming surface to determine the forming surface temperature on the upper die. Another thermocouple, identified as the die probe in the graphs, was placed within the lower die towards the lower die forming surface to determine the forming surface temperature on the lower die. A third thermocouple, identified as the punch heater in the graphs, was positioned to determine the temperature of the ring heater in the upper die. A fourth thermocouple, identified as die heater 1 in the graphs of FIGS. 16 and 17, was positioned to determine the temperature of one of the ring heaters in the lower die. A final thermocouple, identified as die heater 2 in the graphs of FIGS. 16 and 17, was positioned to determine the temperature of the other ring heater in the lower die.

With respect to the graphs of FIGS. 18 and 19, one thermocouple identified as the punch probe in the graphs was placed within the upper die towards the upper die forming surface to determine the forming surface temperature on the upper die, and another thermocouple, identified as the die probe in the graphs, was placed within the lower die towards the lower die forming surface to determine the forming surface temperature on the lower die. A third thermocouple, identified as the punch heater in the graphs, was positioned to determine the temperature of the cast-in heater in the upper die. A final thermocouple, identified as the die heater in the graphs of FIGS. 18 and 19, was positioned to determine the temperature of the cast-in heaters in the lower die.

FIGS. 16 and 18 provide the temperature data obtained from the various thermocouples during production of nine inch plates and upon ceasing press formation of the plates (i.e., shutdown). The press forming apparatus were set up to achieve a temperature of approximately 320° F. at the forming surfaces. At time zero in FIGS. 16 and 18, the press forming apparatus has been heated up and production of the plates is started. As can be seen from FIG. 16, the die probe and the punch probe sense during the first few minutes of production that the forming surface temperature at the upper and lower dies has fallen below the desired temperature of 320° F. The ring heaters in the upper and lower dies thus experience a significant temperature spike in an attempt to raise the forming surface temperature at the upper and lower dies. The ring heater in the upper die ultimately reaches a maximum temperature of 910° F. while the ring heaters in the lower die reach a maximum temperature of 696° F. and 746° F. The operation of the ring heaters at these significantly high temperatures severely reduces the operational life of the ring heaters.

As further shown in FIG. 16, when the production of plates is stopped (i.e., at press shutdown), there are no longer any moistened blanks and resulting formed plates to act as a heat sink and so the temperature at the forming surface of the upper die and the lower die increases. During this time, the forming surface of the upper die reaches a temperature of about 372° F. while the forming surface of the lower die reaches a temperature of about 348° F. When the production is shutdown only for a relatively short period of time (i.e., a period of time insufficient to allow the forming surfaces to cool down to any significant extent), the forming surface temperatures will be in excess of the desired temperature when production is once again restarted, particularly with respect to the upper die forming surface. When the forming surface temperature greatly exceeds the desired forming surface temperature (e.g., approximately 320° F.) upon production restart, such as in the case of the upper die forming surface shown in FIG. 16, difficulties may arise in that, for instance, the product can delaminate or blister due to steam pressure within the moistened paperboard, or may not freely become separated from the forming surface.

Within the operational cycle illustrated in FIG. 16, the maximum temperature at the forming surface of the lower die reached about 348° F. while the minimum temperature at the forming surface of the lower die reached about 309° F. This means that the lower die forming surface temperature dropped 11° F. below the desired surface temperature of approximately 320° F. and exceeded the desired surface temperature of approximately 320° F. by 28° F. Thus, the forming surface temperature on the lower die varied over a range of about 39° F.

In addition, within the operational cycle illustrated in FIG. 16, the maximum temperature at the forming surface of the upper die reached about 372° F. while the minimum temperature at the forming surface of the upper die reached about 286° F. The upper die forming surface temperature thus dropped 34° F. below the desired surface temperature of approximately 320° F. and exceeded the desired surface temperature of approximately 320° F. by 52° F. The upper die forming surface temperature thus varied over a range of about 86° F. The 86° F. variation in the forming surface temperature of the upper die can significantly hinder the press forming process from the standpoint of consistently producing high quality products meeting the desired specifications.

Considering the graph in FIG. 18, the results associated with the use of cast-in heaters are quite different. When the die probe and the punch probe sense that the forming surface temperature at the upper and lower dies has fallen below the desired temperature of approximately 320° F., the cast-in heaters in the upper and lower dies increase in temperature to raise the forming surface temperature to the desired level. However, the temperature increase is not nearly as significant as in the case of the ring heaters, as the cast-in heater in the upper die reaches a temperature of only about 434° F. while the cast-in heater in the lower die reaches a temperature of only about 559° F. Thus, the cast-in heaters do not experience the same significant temperature spikes as the ring heaters and are not operated at the same excessive levels as the ring heaters.

As further shown in FIG. 18, upon stopping the production of plates (i.e., at press shutdown), the temperature at the forming surface of the upper die and the lower die increases. Within the operational cycle illustrated in FIG. 18, the maximum temperature at the forming surface of the lower die reached about 349° F. while the minimum temperature at the forming surface of the lower die reached about 300° F. The lower die forming surface temperature thus dropped 20° F. below the desired surface temperature of 320° F. and exceeded the desired surface temperature of approximately 320° F. by 29° F., while varying over a range of 49° F. In addition, within the operational cycle illustrated in FIG. 18, the maximum temperature at the forming surface of the upper die reached about 328° F. while the minimum temperature at the forming surface of the upper die fell to about 305° F. The upper die forming surface temperature thus dropped 15° F. below the desired surface temperature of approximately 320° F. and exceeded the desired surface temperature of approximately 320° F. by 8° F., varying over a range of 23° F. Although the forming surface temperature at the lower die associated with the cast-in heater was generally about the same as in the case of the ring heaters, the forming surface temperature at the upper die associated with the use of the cast-in heater was significantly less than in the case of the ring heater. This means that the temperature of the forming surface on the upper die remains much closer to the desired temperature, thus providing a variety of benefits from the standpoint of consistently producing high quality products meeting desired production standards.

The graphs in FIGS. 17 and 19 provide temperature data obtained from the various thermocouples during standard heat-up of the press forming apparatus. These graphs once again illustrate the significant differences associated with the use of ring heaters and cast-in heaters. As seen in FIG. 17, as the start-up of the apparatus is initiated at time zero, the ring heater temperatures rise quickly and significantly, ultimately reaching maximum temperatures of about 875° F. and about 816° F. for the lower die ring heaters and about 794° F. for the upper die heater. In contrast, as shown in FIG. 19, the upper die cast-in heater only reaches a temperature of about 546° F. and the lower die cast-in heater only reaches a temperature of about 453° F. Thus, the cast-in heaters do not heat-up to nearly the same extent as the ring heaters which is an important benefit because as the heater is operated under greater and greater temperatures and for longer and longer periods of time, the heater degrades and its useful life is significantly reduced.

Another benefit associated with the present invention is that cast-in heaters can be purchased with a wattage rating within recommended guidelines, thus resulting in significantly longer heater life. It has been found, for example, that one cast-in heater operated at 2800 watts can replace two ring heaters operating at approximately 4000 watts, thus allowing a possible electrical power and cost savings. In addition, because the connection to the electrical resistive element can be exterior of the cast-in heater, a more even heating is possible and cold spots do not arise. Further, the materials which can be used for the cast-in heater also provides more even heating.

The cost of one cast-in heater is typically more than eight times the cost of one ring heater and so utilizing cast-in heaters in place of ring heaters is not what would commonly be considered a viable solution to the problem of die press downtime. However, by virtue of the unexpected results that have been realized, this significant cost difference has been found to not be an impediment to using cast-in heaters for press forming food service containers.

In one respect, it has been found that operational parameters can be met by using only a single cast-in heater in the upper die and the lower die, thus requiring only two cast-in heaters in each die set as opposed to the typical three of four ring heaters. Replacing three or four ring heaters with two cast-in heaters is also advantageous from the standpoint of producing lower probabilities of failures per die set and press, even if the life expectancy were the same, resulting in significantly less downtime and increased productivity.

The economic or monetary benefits associated with reducing the downtime of the die press(es) is quite significant when considered in the context of commercial production. This is particularly so when it is considered that the die press(es) is typically running around the clock, twenty-four hours a day, seven days a week. Separate and apart from the difficulties that press down time creates with respect to around the clock production, press down time can also create significant problems in the case of seasonal production. Seasonal food service containers can typically only be produced and sold within a relatively small window of opportunity and so reduced output associated with press down time can significantly affect the ability to meet consumer demands for these seasonal products.

The tables in FIGS. 20 and 21 show the results of a break-even cost analysis that was performed with respect to the use of ring heaters in a food service paperboard container forming apparatus versus the use of cast-in heaters in a similar apparatus. FIG. 20 illustrates the analysis results for die sets employing three ring heaters and FIG. 21 shows the analysis results for die sets employing four ring heaters. The analysis was performed based on a normal production output for a given product, an average die press downtime of 45 minutes to replace a failed heater, and considering that the die press is running around the clock, which is the case. Further, the analysis was based on a cost of $40 for each ring heater, a cost of $335 for each of the two cast-in heaters used in place of the three ring heater system and a cost of $390 for each of the two cast-in heaters used in place of the four ring heater system. The analysis is based on consideration of the lost production that occurs each time a heater fails and must be replaced. Thus, assuming a ring heater fails once a month, the analysis considers the amount of production that is lost as a result of that downtime and the cost associated with replacing the ring heater. Considering the significantly greater cost associated with the cast-in heater, the analysis then determines the minimum useful life the cast-in heater must exhibit to break-even.

Referring to FIG. 20, it can be seen that if the ring heaters have a life of one month, the break-even cost for using the significantly more expensive cast-in heaters is 1.8 months. This means that if the ring heaters must be replaced every month, it is possible to use cast-in heaters and break-even so long as the cast-in heaters have a useful life of at least 1.8 months. Similarly, if the ring heaters possess a useful life of 12 months (i.e., the ring heaters must be replaced once a year), it is possible to use cast-in heaters and break-even so long as the cast-in heaters have a useful life of at least 21.9 months. Experience has shown that the useful life of the ring heaters typically varies between a minimum of 2 months and a maximum of 9 months. Thus, the break-even analysis reveals that the use of cast-in heaters is economically beneficial if the cast-in heaters are able to operate without replacement for at least 16.4 months. To date, experimentation and testing have shown that the useful-life of the cast-in heaters in the context of fabricating food service paperboard containers exceeds the break-even point.

Figure 22:
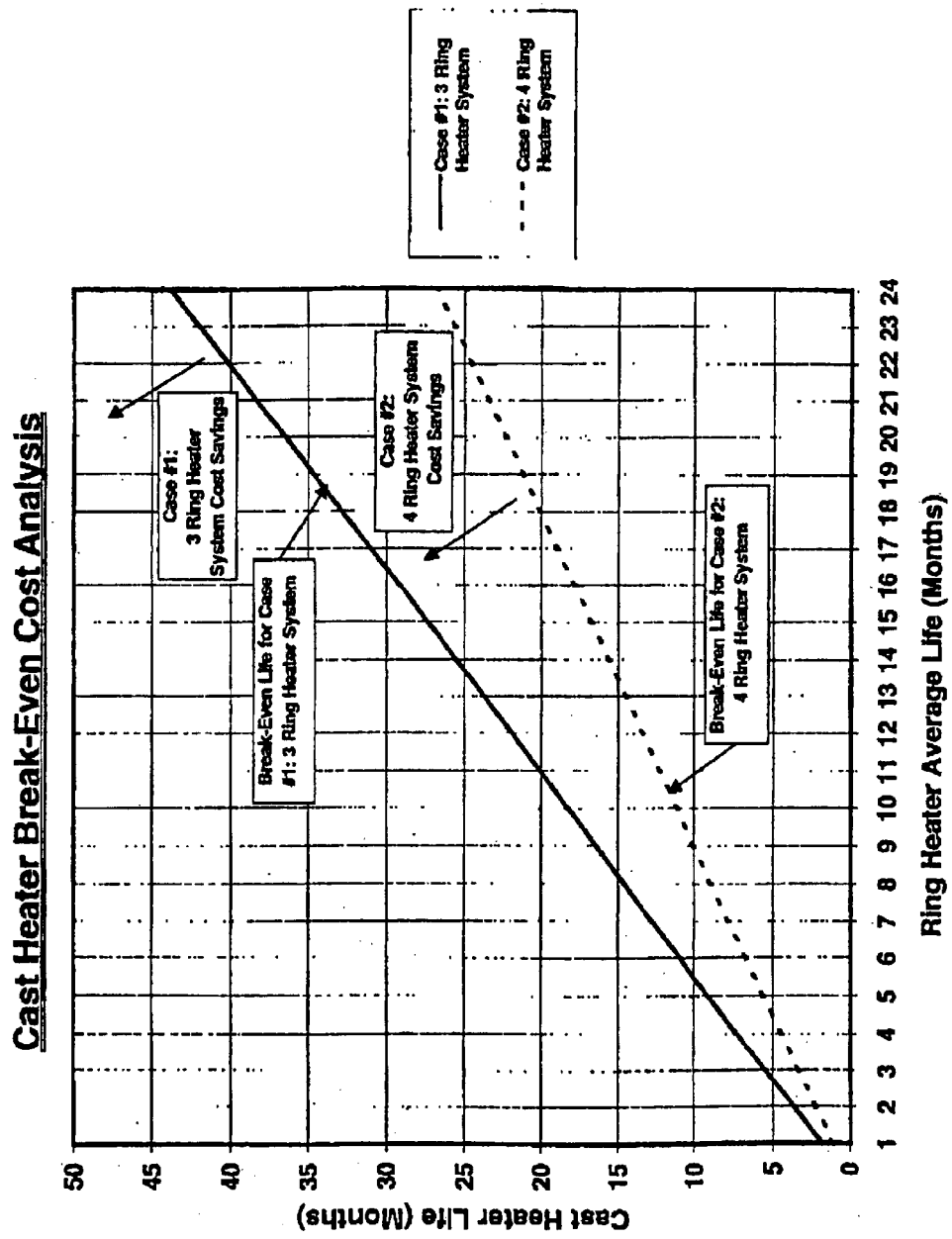
FIG. 22 is a graphical illustration of the analysis results set forth in the tables of FIGS. 20 and 21.

The table in FIG. 21 sets forth the results of a similar analysis with respect to a four ring heater system and shows that the break-even point for the cast-in heaters is even less than in the three ring heater system. FIG. 22 is a graph of the results set forth in the tables of FIGS. 20 and 21.

In addition to the foregoing, there are also other significant advantages associated with the use of cast-in heaters in accordance with the present invention. For example, cast-in heaters have significantly lower heater surface temperatures during heat up and production than in the case of, for example, ring heaters. Also, the maximum heater temperatures for the cast-in heater during standard die set heat up is on the order of about 200° F.–800° F. lower than ring heaters. Further, cast-in heater temperatures during production of food serving paperboard plate products are on the order of about 150° F.–600° F. lower than ring heaters. It is also possible to realize electrical cost savings with the use of cast-in heaters due to their lower wattage and more efficient thermal transfer to the die set.

Also, because the wire heater connection can be made exterior of the cast-in heater, wire breakage due to degradation of the wire from excessive temperature is not likely to occur.

In addition, because cast-in heaters are not susceptible to many of the problems discussed above that are associated with the use of ring heaters in pressing apparatus that press form paperboard blanks into food serving paperboard container products, the cast-in heaters have a significantly longer useful life. This means that cast-in heaters need not be replaced with nearly the same frequency as ring heaters, thus advantageously reducing the down-time of the pressing apparatus and the resulting loss of product and profit potential.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A pressing apparatus for producing from a paperboard blank a food service paperboard container having an overturned rim provided with folds, comprising:
   a first die that includes a first base and a first platform movable with respect to the first base, said first base having a curved surface for engaging an outer periphery of a paperboard blank;
   a second die positioned in opposing relation to the first die and including a second base and a second platform movable with respect to the second base, said second die being movable with respect to the first die, said second base having a curved surface for mating with the curved surface on the first die and engaging the outer periphery of the paperboard blank so that the outer periphery of the paperboard blank is pressed between the curved surface of the first base and the curved surface of the second base;
   a first cast-in heater mounted within a recess in the first die, the first cast-in heater including a resistor wire embedded within a thermally conductive cast-in material; and
   a second cast-in heater mounted within a recess in the second die, the second cast-in heater including a resistor wire embedded within a thermally conductive cast-in material.

2. The pressing apparatus according to claim 1, wherein the recess in which the first cast-in heater is mounted is in the first base.

3. The pressing apparatus according to claim 2, wherein the recess in which the second cast-in heater is mounted is in the second base.

4. The pressing apparatus according to claim 1, wherein the cast-in material of the first and second cast-in heaters is a thermally conductive material.

5. The pressing apparatus according to claim 4, wherein the cast-in material for the first and second cast-in heaters is a ferrous or non-ferrous based alloy including an iron-based alloy, an aluminum-based alloy, a copper-based alloy, a magnesium-based alloy, a nickel-based alloy or a titanium-based alloy.

6. The pressing apparatus according to claim 1, wherein the resistor wire of the first and second cast-in heaters is a coiled resistor wire located within a sleeve.

7. The pressing apparatus according to claim 1, wherein only a single cast-in heater is mounted in the first die and only a single cast-in heater is mounted in the second die.

8. A pressing apparatus for producing a food service paperboard container from a paperboard blank, wherein the paperboard container has an overturned rim provided with folds, comprising:
   a first die having a curved pressing surface;
   a second die positioned in opposing relation to the first die and having a curved pressing surface, at least one of said first and second dies being movable relative to the other of the first and second dies to cause an outer periphery of a paperboard blank to be pressed between the curved pressing surface of the first die and the curved pressing surface of the second die; and
   a cast-in heater mounted in either the first die or the second die.

9. The pressing apparatus according to claim 8, wherein the cast-in heater is mounted in a recess in the first die.

10. The pressing apparatus according to claim 9, wherein the cast-in heater is mounted in the first die and constitutes a first cast-in heater, and including a second cast-in heater mounted in the second die.

11. The pressing apparatus according to claim 8, wherein the cast-in heater includes a resistor wire embedded within a thermally conductive cast-in material.

12. The pressing apparatus according to claim 11, wherein the cast-in material is a ferrous or non-ferrous based alloy including an iron-based alloy, an aluminum-based alloy, a copper-based alloy, a magnesium-based alloy, a nickel-based alloy or a titanium-based alloy.

13. The pressing apparatus according to claim 11, wherein the resistor wire is a coiled resistor wire located within a sleeve.

14. The pressing apparatus according to claim 8, wherein a single cast-in heater is mounted in the first die and a single cast-in heater is mounted in the second die.

15. The pressing apparatus according to claim 8, wherein the first die includes a first base and a first platform movable with respect to the first base, said curved surface being provided on said first base.

16. The pressing apparatus according to claim 8, wherein the second die includes a second base and a second platform movable with respect to the second base, said curved surface being provided on said second base.

17. The pressing apparatus according to claim 1, wherein the first cast-in heater is removably mounted in the recess in the first die, and the second cast-in heater is removably mounted in the recess in the second die.

18. The pressing apparatus according to claim 8, wherein the cast-in heater is removably mounted in either the first die or the second die.

19. A pressing apparatus for producing from a paperboard blank a food service paperboard container having an overturned rim provided with folds, comprising:
   a first die having a curved pressing surface;
   a second die positioned in opposing relation to the first die and having a curved pressing surface, at least one of said first and second dies being movable relative to the other of the first and second dies to cause an outer periphery of a paperboard blank to be pressed between the curved pressing surface of the first die and the curved pressing surface of the second die; and
   a heating element embedded within a thermally conductive cast-in material to form a cast-in heater, the cast-in heater being removably positioned in either the first die or the second die.

20. The pressing apparatus according to claim 19, wherein the cast-in heater is mounted in a recess in either the first die or the second die.

21. The pressing apparatus according to claim 19, wherein the cast-in heater is a first cast-in heater that is mounted in the first die and including a second cast-in heater mounted in the second die.

22. A pressing apparatus for producing from a paperboard blank a food service paperboard container having an overturned rim provided with folds, comprising:

a first die having a curved pressing surface;

a second die positioned in opposing relation to the first die and having a curved pressing surface, at least one of said first and second dies being movable relative to the other of the first and second dies to cause an outer periphery of a paperboard blank to be pressed between the curved pressing surface of the first die and the curved pressing surface of the second die; and a heating element embedded within a thermally conductive cast-in material to form a cast-in heater, the cast-in heater being removably positioned in the first die, and including at least one air tube extending through a hole in the cast-in heater and through a hole in the first die, the air tube communicating with the pressing surface of the first die.

23. A pressing apparatus for producing a food service paperboard container from a paperboard blank, wherein the paperboard container has an overturned rim provided with folds, comprising:

a first die having a curved pressing surface and a recess with a recessed heater mounting surface in proximity with and opposed thereto;

a second die positioned in opposing relation to the first die and having a curved pressing surface and a recess with a recessed heater mounting surface in proximity with and opposed thereto, at least one of said first and second dies being movable relative to the other of the first and second dies to cause an outer periphery of a paperboard blank to be pressed between the curved pressing surface of the first die and the curved pressing surface of the second die; and a cast-in heater mounted in either the first die or the second die, the cast-in heater being configured and mounted such that a surface of the cast-in heater is in surface-to-surface contact with a recessed heater mounting surface in proximity with and opposed to a curved forming surface of the apparatus.

24. The pressing apparatus according to claim 23, wherein the cast-in heater has an annular shape.

25. The pressing apparatus according to claim 23, wherein at least one of the recesses of the dies has a peripheral wall extending away from the heater mounting surface of the recess and has a cast-in heater mounted in the recess in surface to surface contact with the peripheral wall of the recess.

26. A pressing apparatus for producing a food service paperboard container from a paperboard blank, wherein the paperboard container has an overturned rim provided with folds, comprising:

a first die having a curved pressing surface;

a second die positioned in opposing relation to the first die and having a curved pressing surface, at least one of said first and second dies being movable relative to the other of the first and second dies to cause an outer periphery of a paperboard blank to be pressed between the curved pressing surface of the first die and the curved pressing surface of the second die; and a cast-in heater mounted in either the first die or the second die, the cast-in heater having an annular shape.

* * * * *

UNITED STATES PATENT AND TRADEMARK OFFICE
CERTIFICATE OF CORRECTION

PATENT NO. : 6,932,753 B1  
APPLICATION NO. : 10/785172  
DATED : August 23, 2005  
INVENTOR(S) : Bruce R. Smith et al.

It is certified that error appears in the above-identified patent and that said Letters Patent is hereby corrected as shown below:

In Col. 1, line 32, insert --.-- after "inexpensive";  
In Col. 3, line 25, delete "difficulties" and insert --difficulty--;  
In Col. 5, line 32, insert --to-- after "mounted";  
In Col. 6, line 2, delete "ter" and insert --heater--;  
In Col. 8, line 48, delete "person" and insert --persons--; and  
In Col. 15, line 27, delete "provides" and insert --provide--

Signed and Sealed this

Twenty-second Day of August, 2006

JON W. DUDAS  
*Director of the United States Patent and Trademark Office*

UNITED STATES PATENT AND TRADEMARK OFFICE
CERTIFICATE OF CORRECTION

PATENT NO.       : 6,932,753 B1
APPLICATION NO.  : 09/453498
DATED            : August 23, 2005
INVENTOR(S)      : Bruce R. Smith et al.

It is certified that error appears in the above-identified patent and that said Letters Patent is hereby corrected as shown below:

In Col. 1, line 32, insert --.-- after "inexpensive";
In Col. 3, line 25, delete "difficulties" and insert --difficulty--;
In Col. 5, line 32, insert --to-- after "mounted";
In Col. 6, line 2, delete "ter" and insert --heater--;
In Col. 8, line 48, delete "person" and insert --persons--; and
In Col. 15, line 27, delete "provides" and insert --provide--

This certificate supersedes Certificate of Correction issued August 22, 2006.

Signed and Sealed this

Tenth Day of October, 2006

JON W. DUDAS
*Director of the United States Patent and Trademark Office*